(12) United States Patent
Lyubashevskiy et al.

(10) Patent No.: US 6,480,950 B1
(45) Date of Patent: Nov. 12, 2002

(54) SOFTWARE PAGING SYSTEM

(75) Inventors: Igor Lyubashevskiy, Brighton; Albert Hopeman, Arlington; James E. Carey, Brookline, all of MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/490,424

(22) Filed: Jan. 24, 2000

(51) Int. Cl.[7] .............................................. G06F 12/00
(52) U.S. Cl. ...................... 711/206; 711/202; 711/207
(58) Field of Search ................................ 711/206, 207, 711/202, 1

(56) References Cited

U.S. PATENT DOCUMENTS

| | | | | |
|---|---|---|---|---|
| 5,446,854 A | * | 8/1995 | Khalidi et al. .................. | 711/1 |
| 5,465,337 A | * | 11/1995 | Kong .......................... | 711/207 |
| 5,680,566 A | | 10/1997 | Peng et al. .................. | 395/416 |
| 5,724,538 A | * | 3/1998 | Morris et al. ................ | 711/206 |
| 5,752,275 A | | 5/1998 | Hammond .................... | 711/207 |
| 5,809,563 A | * | 9/1998 | Yamada et al. ............. | 711/207 |
| 5,835,964 A | | 11/1998 | Draves et al. .............. | 711/207 |
| 5,893,931 A | | 4/1999 | Peng et al. .................. | 711/206 |
| 5,907,867 A | | 5/1999 | Shinbo et al. ............... | 711/207 |
| 5,924,126 A | | 7/1999 | Rosenthal et al. .......... | 711/207 |
| 5,940,872 A | | 8/1999 | Hammond et al. .......... | 711/207 |
| 5,940,873 A | | 8/1999 | Mou .......................... | 711/208 |
| 5,953,742 A | * | 9/1999 | Williams ..................... | 711/154 |
| 6,088,780 A | * | 7/2000 | Yamada et al. ............. | 711/206 |
| 6,298,428 B1 | * | 10/2001 | Munroe et al. ............. | 711/202 |

OTHER PUBLICATIONS

Rashid, R., et al., "Machine–Independent Virtual Memory Management for Paged Uniprocessor and Multiprocessor Architectures," Paper presented at the 2nd Symposium on Architectural Support for Programming Languages and Operating Systems, ACM, (Oct., 1987).

* cited by examiner

*Primary Examiner*—Do Hyun Yoo
*Assistant Examiner*—Nasser Moazzami
(74) *Attorney, Agent, or Firm*—Hamilton, Brook, Smith & Reynolds, P.C.

(57) ABSTRACT

A method for translating, in a software paging system, an input key describing a virtual page to the address of the page in main memory, comprises creating, in main memory, a translation buffer which has a plurality of records. Each record has a plurality of cells, each cell having a key field for storing a key or a portion of a key which identifies a page in memory, and each cell having an address field for storing the address of the identified page. If the input key matches a stored key, the address associated with the identified page is retrieved. Otherwise, a paging manager is invoked to establish an address for the input key, and the input key and established address are saved. The least recently used order of memory pages addressed in the dereferenced record is indicated by updating a least recently used cell indicator associated with the dereferenced record. Alternatively, a table having a plurality of entries is created, wherein each entry references a respective hash chain of translation records in a main memory translation buffer. Each translation record has a key field for storing a key identifying a page, and an associated address field for storing the address of the identified page in memory. The records of the hash chain are searched until a translation record is found which has a key value matching the input key.

83 Claims, 18 Drawing Sheets

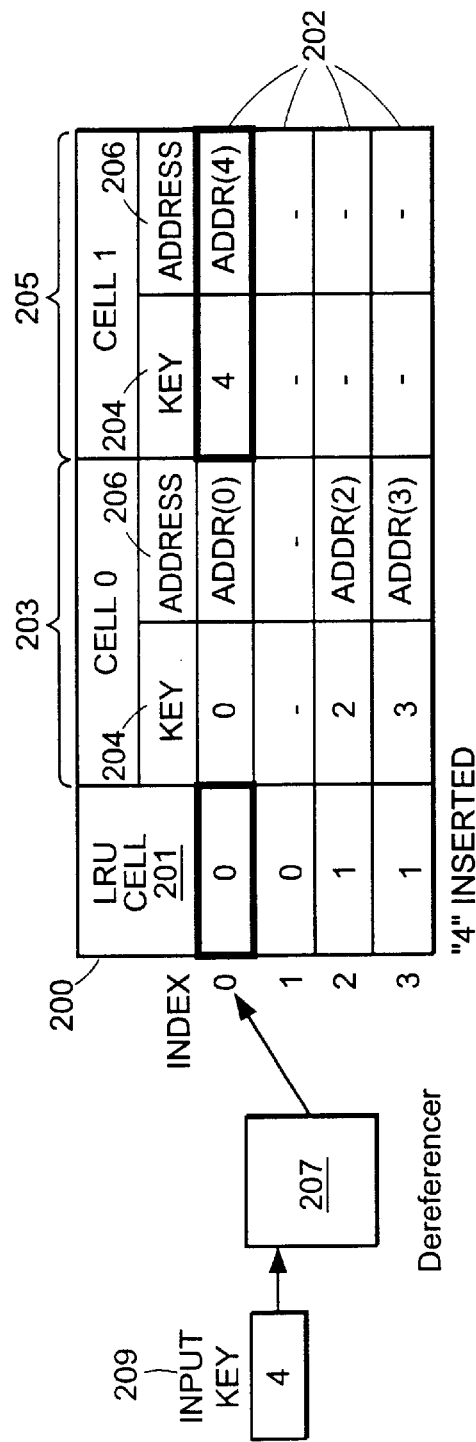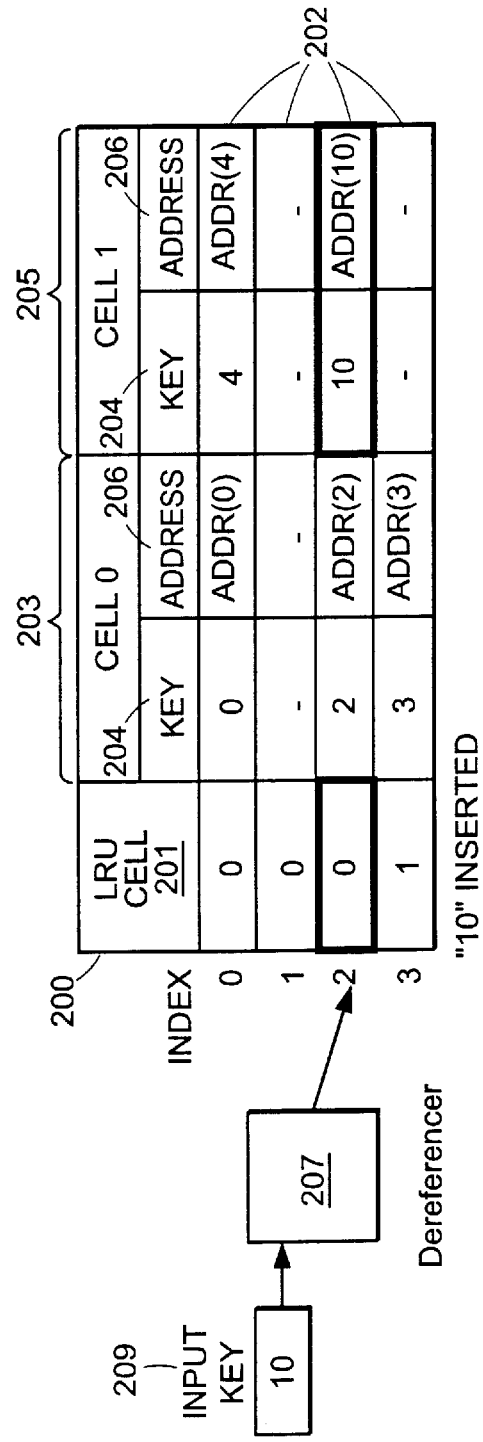

FIG. 5

INITIAL STATE

"0" INSERTED

"2" INSERTED

"3,4" INSERTED

"10" INSERTED

"8" INSERTED

"4" LOCATED

"18" INSERTED

SOFTWARE PAGING SYSTEM

BACKGROUND OF THE INVENTION

In Oracle Express and other paging systems, access to data in a database is provided by demand paging of information into a fixed set of memory buffers. To provide access to a page of information, the paging system must locate the requested page in the main memory or, if the page is not in the main memory, the paging system must read the page into the main memory from disk. This process is called "page translation."

One of the first things done by typical virtual memory paging systems during a page translation is to locate an internal record with information about the requested page. This applies to both software and hardware virtual memory systems. In the presence of a great number of virtual pages shared by many users, this process typically requires searching large trees of data, involving expensive synchronization operations and additional page translations to access the data in those trees.

SUMMARY OF THE INVENTION

Almost every software application exhibits spatial locality of page translations. That is, the same relatively small set of pages is translated repeatedly during some period of time. Hence, paging systems very often search for the same information records repeatedly. These searches are redundant and very expensive in terms of time and computer resources.

Modern computer hardware architectures typically include specialized translation lookaside buffer (TLB) hardware to reduce the number of expensive and redundant searches. That hardware stores, or caches, the results of several recent searches so that those results can be reused if the same virtual page needs to be translated again.

Software applications, however, have little or no direct control over the TLB hardware. Hence, when a database server, for example, needs to access some record identified by, say, a page descriptor comprising a database number, page space number and page number, it cannot utilize the TLB. As a consequence, software paging systems typically did not address the problem of redundant searches and, therefore, performed redundant searches very often.

The present system applies hardware TLB techniques to a software virtual memory paging system. Experiments have indicated that software implementation of a TLB caching system eliminates the need for expensive searches in over 99% of page translations.

One embodiment of the present system uses a 2-way associative cache which contains a plurality of records. Each record has two cells for holding the results of searches for two page translations. During a page translation, a record is selected by computing a hash function of a page descriptor which may comprise a database identifier, a page space identifier, and a page number. If either cell contains the search result for the given page descriptor, no search is needed. Otherwise, a search is performed, and the search result replaces the least-recently-used cell in the record. This method can be generalized to an N-way associative cache method by maintaining N cells per record.

Another embodiment uses a LRU (least recently used) cache which employs a hash table of doubly linked lists of records, where each record holds the result of only one page translation search. All records also belong to a doubly linked LRU list, which is maintained so that the least-recently-used record is at the head of the list, and the most-recently-used record is at the tail.

During a page translation, a list of records corresponding to the value of the hash function of the page descriptor is selected from the hash table. If a record containing the search result for the given page descriptor is located in that list, no search is needed. Otherwise, the search is performed, and its result replaces the least-recently-used record in the entire cache. That record is then removed from its hash list and placed in the hash list that corresponds to the value of the hash function of the page descriptor.

The advantage of the LRU cache over the 2-way associative cache is the superb (perfect) retention of the results of recent searches, given the same maximum number of searches which can be cached. However, a 2-way associative cache requires at least four times less memory, and therefore can store many more search results for the same amount of memory. Also, because the 2-way associative cache does less bookkeeping, it is faster.

The present system includes a method of translating, in a software paging system, an input key describing a virtual page to the address of the page in memory. The system comprises creating, in main memory, a translation buffer which has a plurality of records. Each record has a plurality of translation entries or cells, and each cell has a key field for storing at least a portion of a key which identifies a page in memory. In addition, each cell has an address field for storing the address of the identified page. A record in the translation buffer is dereferenced from the input key, for example, by applying a hashing function, or dereference, to the input key to obtain a pointer to the dereferenced record. The input key is then compared with the keys stored in the dereferenced record. If the input key matches one of the stored keys, the address associated with the identified page is retrieved from the corresponding address field. If the input key does not match any key stored in the dereferenced record, a paging manager is invoked to establish an address for the input key, and the input key and established address are saved in a translation entry, or cell, of the dereferenced record.

In a particular embodiment, each translation entry also has a version field. Upon saving the address in the address field of a translation entry, a version identifier is saved in the version field of the translation entry. The version identifier is incremented each time a different virtual page is associated with the address. Upon an input key match, the version identifier of the corresponding translation entry is compared with the last retrieved version identifier for the same input key. The data from the page associated with the address is retrieved only if the version identifiers match.

Specifically, the key comprises a context and a page number, and the context comprises a database number and a page space number.

In one embodiment, the least recently used order of memory pages addressed in the dereferenced record is indicated by updating a least-recently-used cell indicator associated with the dereferenced record. In an embodiment where each record has two translation entries, the least-recently-used cell indicator is a single bit.

Where the system is employed in a multithreaded system, each thread can be associated with its own translation buffer to eliminate the need for expensive synchronization.

In accordance with another embodiment of the present system, a table having a plurality of entries is created. Each entry references a respective chain of translation records in a main memory translation buffer. Each chain, or hash chain, is associated with a unique key. Preferably, each hash chain is a doubly-linked list. Each translation record has a key field for storing a key identifying a page, and an associated address field for storing the address of the identified page in memory. A chain of translation records associated with the input key is dereferenced from the input key. The records of the dereferenced hash chain are searched until a translation record is found which has a key value matching the input key. Upon finding a match, the address is retrieved from the address field of the translation record having the matching key, and the translation record is indicated as the most recently used. If, on the other hand, no match is found, a page manager is invoked which establishes the address corresponding to the input key. The address is saved in the address field of the least recently used translation record, which is then indicated as the most recently used translation record. The translation record is then placed into the hash chain associated with the input key.

Preferably, a list of translation records is created which is ordered by least recent use (LRU). The LRU chain thereby provides an indication of which translation record is the most recently used and which translation record is the least recently used. Preferably, the LRU chain is a doubly-linked list.

BRIEF DESCRIPTION OF THE DRAWINGS

The foregoing and other objects, features and advantages of the invention will be apparent from the following more particular description of a Software Paging System, as illustrated in the accompanying drawings in which like reference characters refer to the same parts throughout the different views. The drawings are not necessarily to scale, emphasis instead being placed upon illustrating the principles of the invention.

FIGS. 3A–3H illustrate the operation of a 2-way cache embodiment.

FIG. 5 illustrates a variation of the 2-way cache of FIGS. 3A–3H in which each cell has a version field.

DETAILED DESCRIPTION OF THE PREFERRED EMBODIMENT

Figure 1:
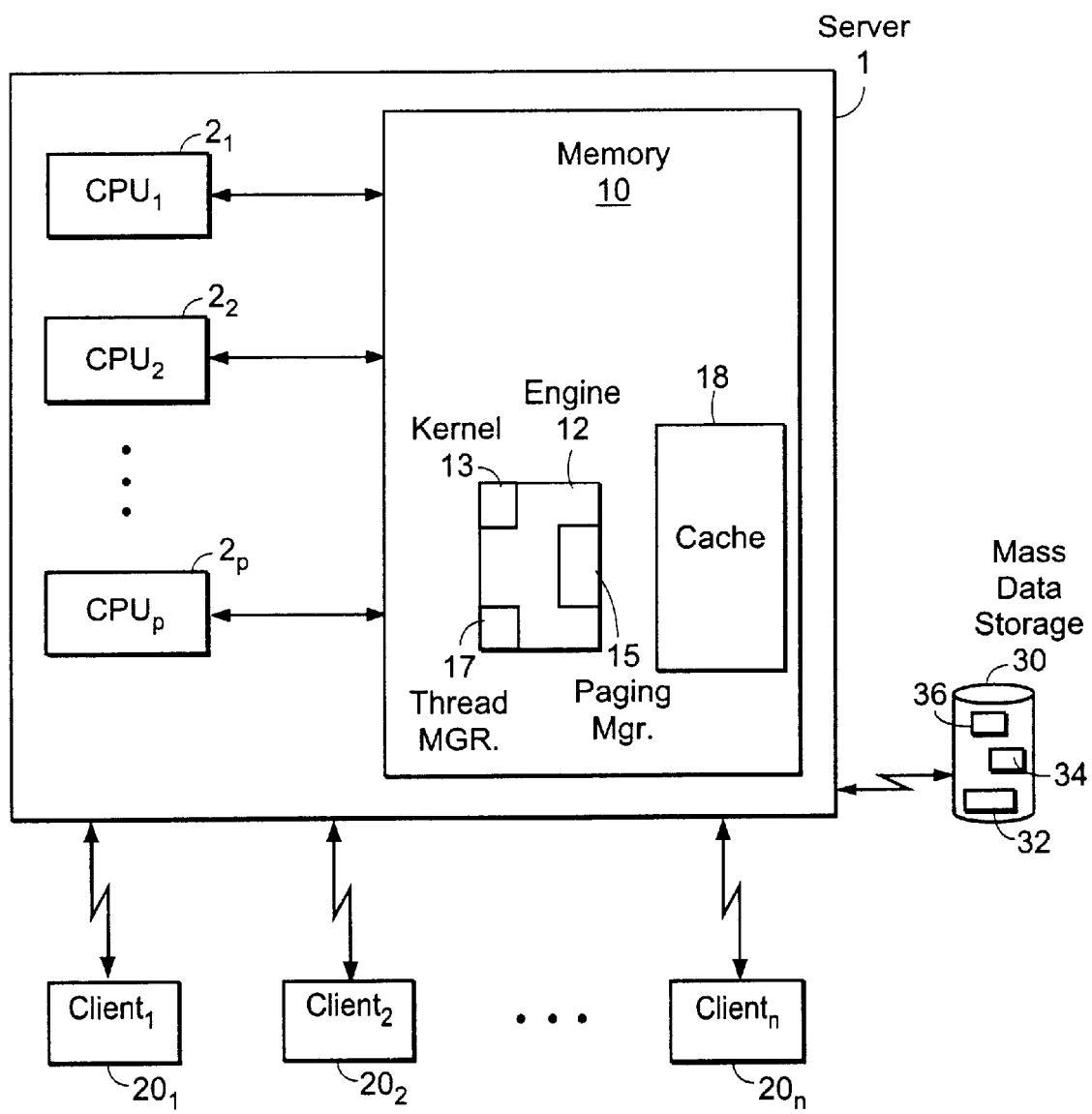
FIG. 1 is a schematic block diagram of an on-line analytic processing (OLAP) system.

FIG. 1 is a schematic block diagram of an on-line analytic processing (OLAP) system. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13, a paging manager 15 and a thread manager 17.

The user sessions execute paging manager instructions, including page transfer functions, to manage pages in memory.

The user sessions and system management processes can include processing threads managed by the thread manager 17 in a multi-threaded OLAP engine 12. That is, user sessions can accomplish tasks by asynchronously executing processing threads. The system can take the form of computer executable instructions embedded in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals. These instructions are executed by one or more CPUs $2_1, 2_2, \ldots, 2_p$ to implement the OLAP engine 12. A particular embodiment of the system is commercially available as Oracle Express Server, version 6.3, from Oracle Corporation.

The paging manager 15 receives page requests from the client users $20_1, 20_2, 20_n$, and ensures that current pages are retrieved from disk 30 and stored in the shared cache memory 18. The cache memory 18 can be global memory or memory assigned to the OLAP application by the server operating system.

With many page translations to track, bookkeeping can become a problem. Many software applications, however, exhibit a locality property, where software or data pages already loaded in memory are reused. This occurs generally more than 99% of the time.

In addition, when the server is multi-threaded, it is necessary to synchronize the threads' page translations. This can consume up to 80% of a computer's resources.

A standard response to this problem is to keep often-accessed data separately, in a cache maintained by hardware. However, these hardware caches are designed for a particular purpose and are generally not suitable for page description translations needed by a database server.

Figure 2:
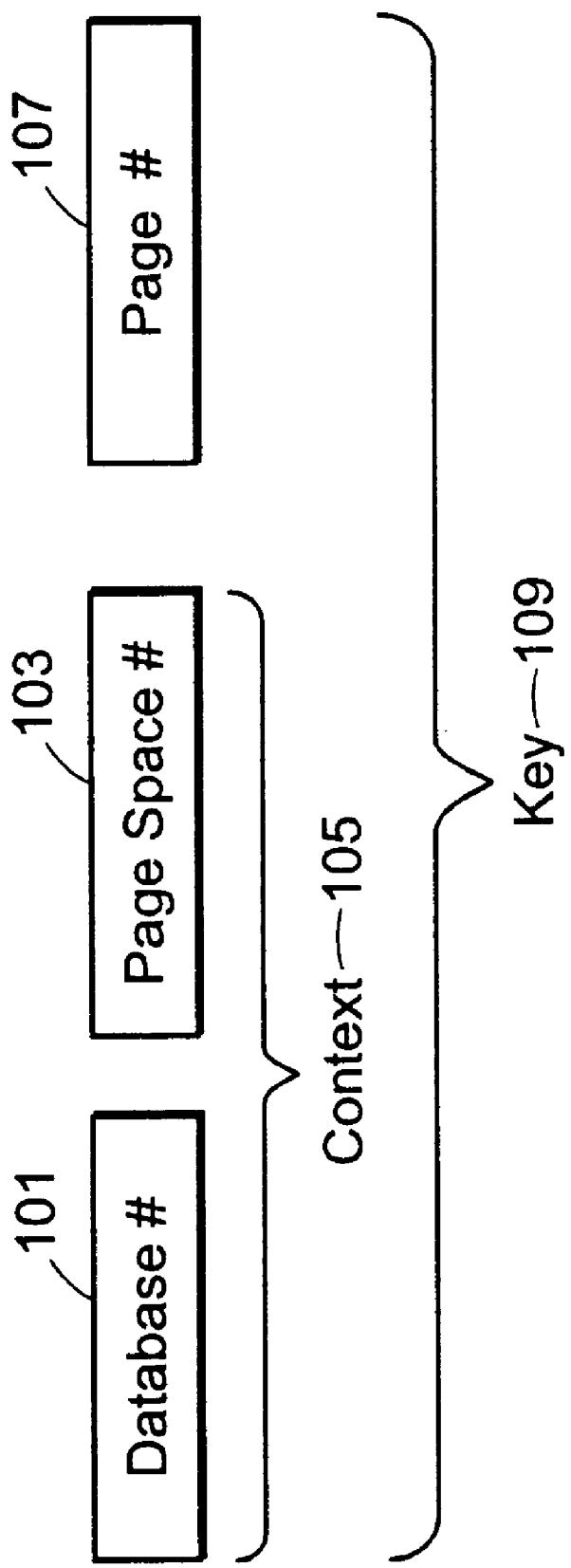
FIG. 2 is a schematic diagram illustrating exemplary elements of a key.

The data is identified by a key. Specifically, as FIG. 2 illustrates, a key 109 preferably comprises a context 105 and a page number 107, while the context itself comprises a database number 101 and a page space number 103. Although the term "page space" is used herein, that term is synonymous with the term "segment" in Oracle RDBMs, while other database venders may use yet other terms.

The present system tailors hardware-style techniques to perform similar functions in software. The hardware is often called a translation lookaside buffer or TLB, and often takes a virtual address provided by a computer program and converts it to a physical address. The data, once loaded, is maintained in a cache, so that the next time it is needed, it does not need to be retrieved from a memory.

The data is identified by a key. Specifically, as FIG. 2 illustrates, a key 109 preferably comprises a context 105 and a page number 107, while the context itself comprises a database number 101 and a page space number 103.

The present system implements similar functionality in software to cache page description translations.

FIGS. 3A–3H illustrate the operation of a 2-way cache embodiment 200, for an input key sequence of: {0, 2, 3, 4, 10, 8, 4}.

Figure 3A:
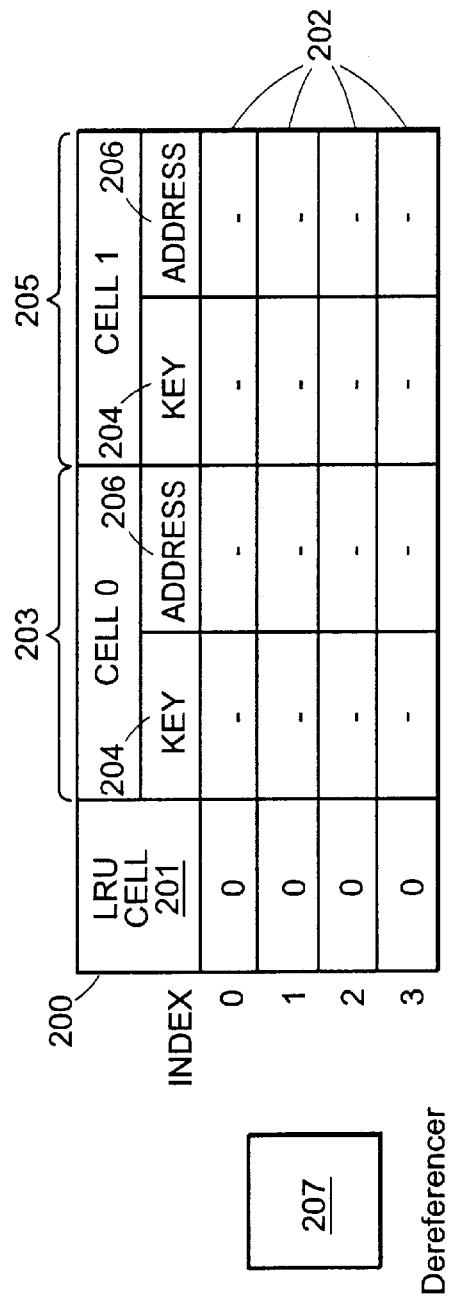

FIG. 3A illustrates a preferred 2-way cache buffer embodiment 200 of the present invention. Each record 202 of the buffer 200 comprises two cells, denoted as Cell0 203 and Cell1 205. Each cell comprises two fields: a key field 204 and an address field 206. For simplicity and clarity of description, a cache with only four records is shown, although in practice a much larger cache would be used.

In addition to the two cells 203, 205, each record 202 also has a least-recently-used (LRU) cell field 201, which indicates which of the record's cells 203, 205 is the least recently used.

FIG. 3A shows the initial state of the cache 200. The content of the cells 203, 205 is not yet valid, as indicated by the dashes. All LRU cell fields 201 are initially set to zero to indicate that each record's Cell0 203 is the least recently used. Of course, as one skilled in the art would recognize, this is an arbitrary initial condition.

In addition to the buffer 200, a dereference 207 dereferences an input index. That is, given an input key describing or identifying some page in memory, the dereference 207 provides a corresponding index to the cache 200. Preferably, the dereference 207 is a hashing function, for example, index=key mod(4), as used in the example of FIGS. 3A–3H.

Figure 3B:
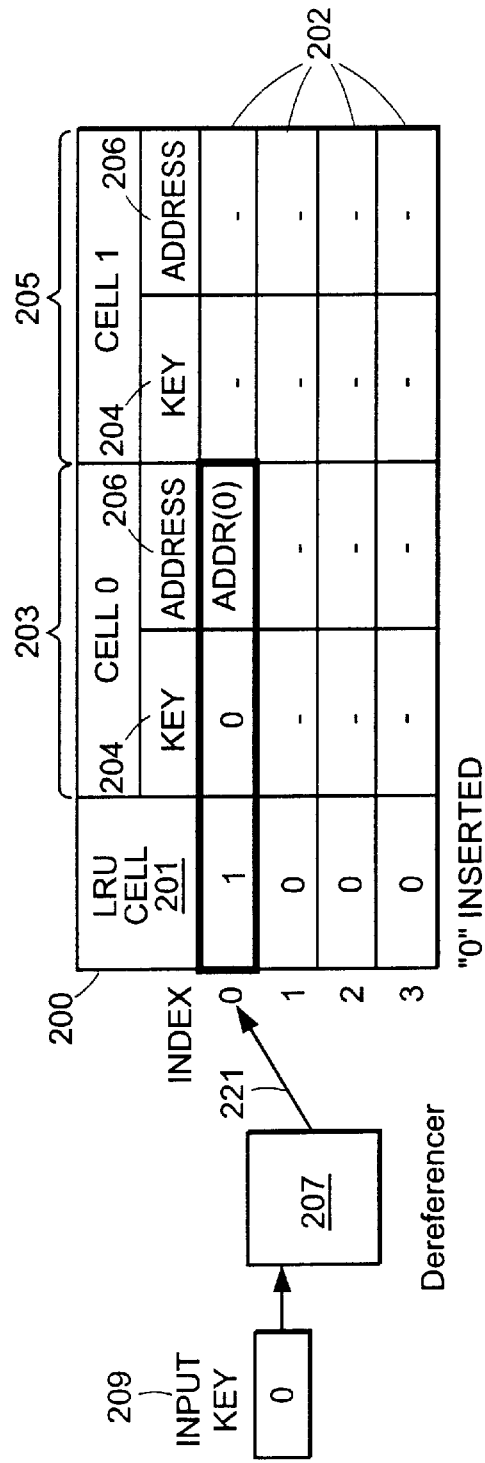

Thus, in FIG. 3B, a page identified by a page descriptor "0", i.e., having an input key=0, is being accessed after initialization of the cache 200. The dereference 207 applies the hashing function to the input key 209, yielding 0 mod(4)=0, which references Record 0, as indicated by the arrow 221. Because no record is found with the value 0 in any key field 205 of Record 0, the address corresponding to input key "0" 209 must be fetched by a paging manager 15 (FIG. 1).

As FIG. 3B shows, after retrieving the proper address corresponding to input key "0", indicated as ADDR(0), the address is placed into Cell0 203 of Record 0, and the input key value "0" is placed into the corresponding key field 203. The LRU cell field 201 for Record 0 is then set to 1 to indicate that Cell1 205 is now the least recently used cell for Record 0. Note that for illustrative purposes, in each of FIGS. 4B–4H, a double border is used around those fields that have been updated since the previous figure.

Figure 3C:
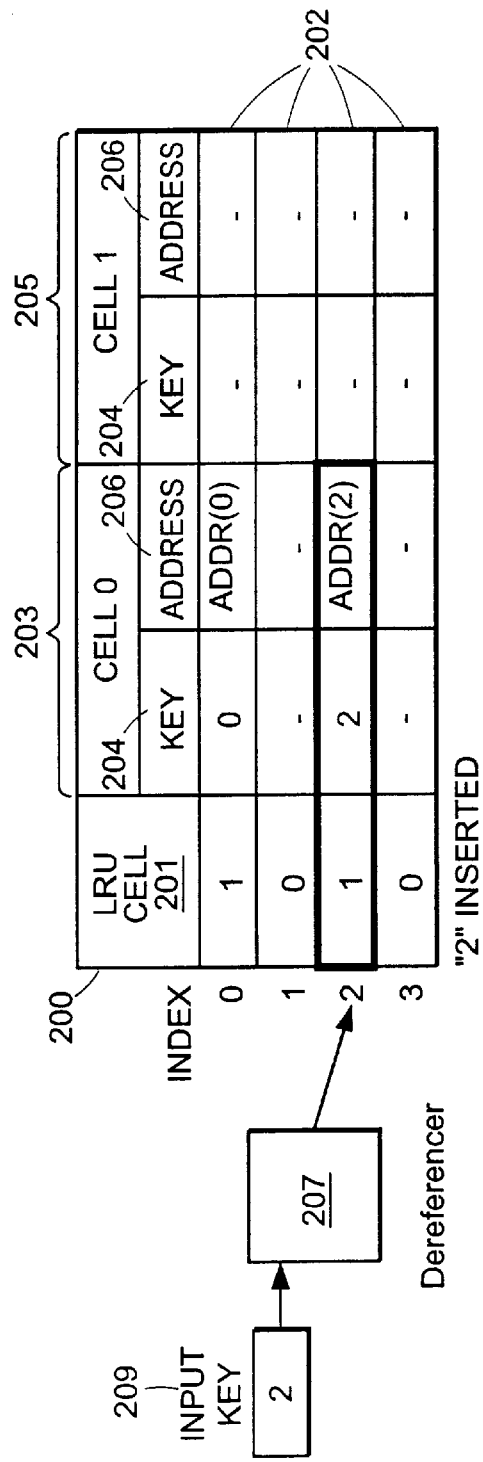

In FIG. 3C, a page identified by input key=2 is accessed. Again, the input key is hashed by the dereferencing hashing function 207, yielding 2 mod(4)=2, referencing Record 2. First, the key fields 204 of Record 2 are examined to see if one of them holds the value "2". In this example, the value "2" is not found in any key field 204, so the paging manager must once again retrieve the address identified by input key=2. The retrieved address ADDR(2) is stored in Record 2's address field 206 and the key value "2" in the key field 204. The LRU cell field 201 for Record 2 is then set to 1 to indicate that Cell1 is the least recently used cell of Record 2.

Figure 3D:
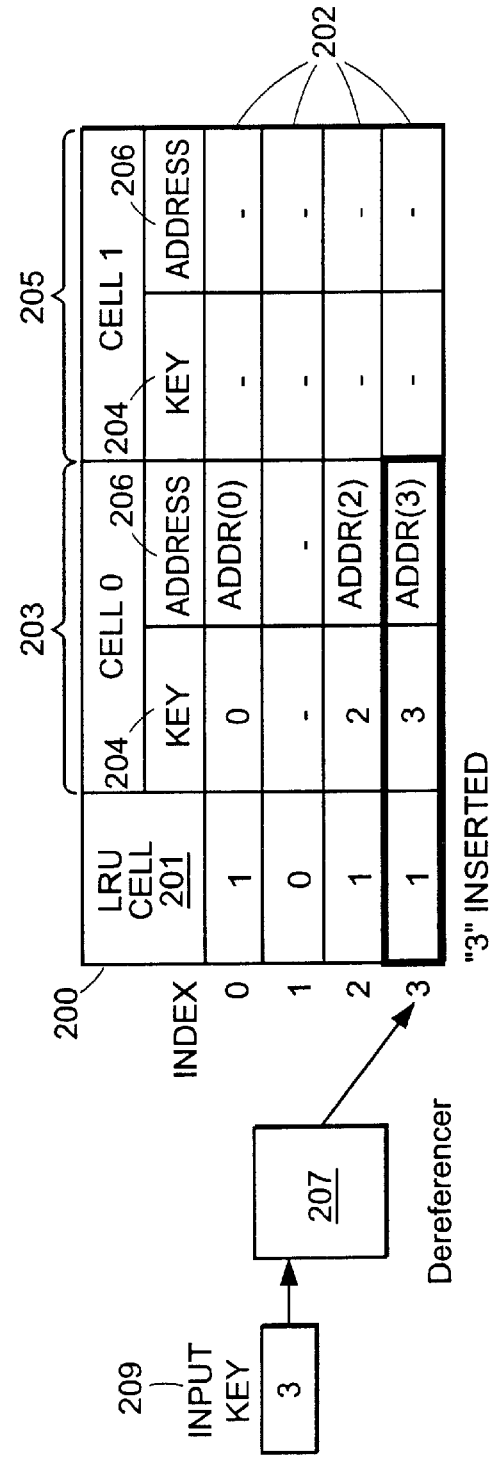

FIG. 3D illustrates similar operation for an access with an input key value of 3, which hashes to 3 mod(4)=3. Therefore, Record 3 is referenced. The value "3" is not found in either of the key fields 204 of Record 3, so the paging manager 15 (FIG. 1) retrieves the address identified by input key=3. The retrieved address ADDR(3) is stored in Cell0's address field 206 and the key value "3" is stored in the key field 204 for Record 3. The LRU cell field 201 for Record 3 is then set to 1 to indicate that Cell1 is the least recently used cell of Record 3.

FIG. 3E illustrates an access to a page identified by input key value=4. Since 4 mod(4)=0, Record 0 is examined. Because neither of Record 0's cells contains the key value "4" in its key field 204, the paging manager 15 (FIG. 1) retrieves the corresponding address, ADDR(4). Because the LRU cell field 201 for Record 0 was a 1 (refer to FIG. 3D), the new address corresponding to page descriptor 4, ADDR (4), is placed into Cell1 205 for Record 0. Next the LRU cell field 201 is changed to 0 to indicate that Cel 0 203 is the least recently used.

FIG. 3F illustrates a similar operation for access to a page identified with an input key value of 10, which hashes to an index value of 2, thus referencing Record 2. Neither key field 204 of Record 2 yet holds the value of "2", so the paging manager 15 (FIG. 1) retrieves the address identified by input key=10. Since the LRU cell field 201 for Record 2 was set to 1, the retrieved address ADDR(10) and the key value "10" are stored in the address field 206 and the key field 204 respectively, of Cell1 205 for Record 2. The LRU cell field 201 for Record 2 is then set to 0 indicate that Cell0 is now the least recently used cell of Record 2.

Figure 3G:
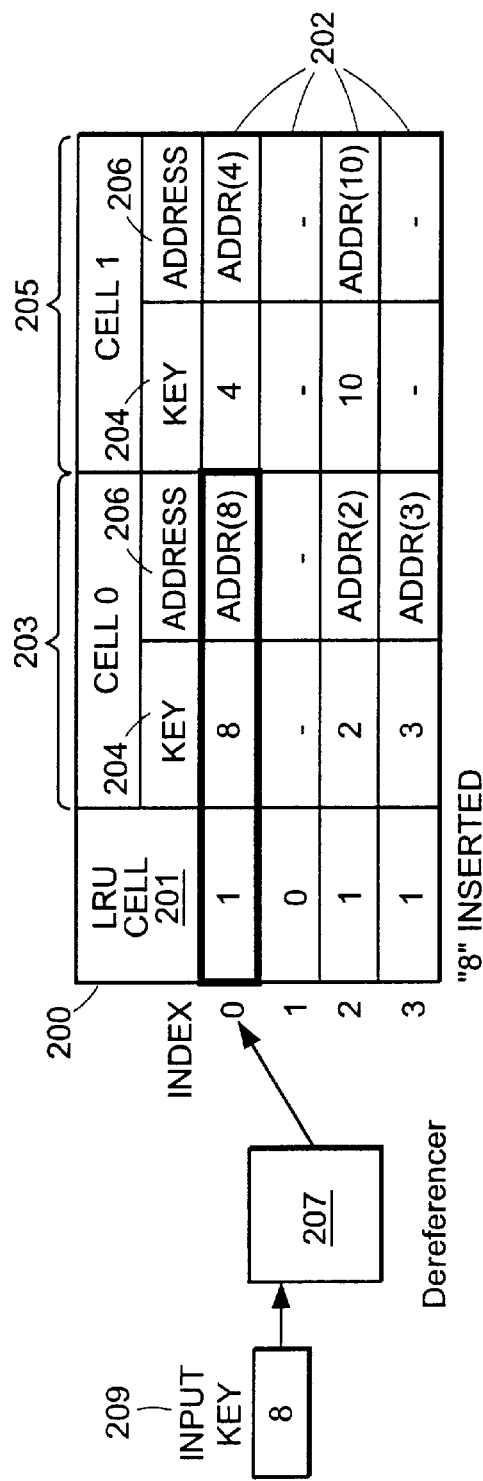

In FIG. 3G, the page identified by input key value of 8 is accessed. 8 mod(4)=0, referencing Record 0. Because the LRU cell field 201 for Record 0 was "0," Cell0 203 for Record 0 is overwritten. The LRU cell field 201 is once again changed to value 1 to indicate that Cell 1 is the least recently used cell of Record 0.

Figure 3H:
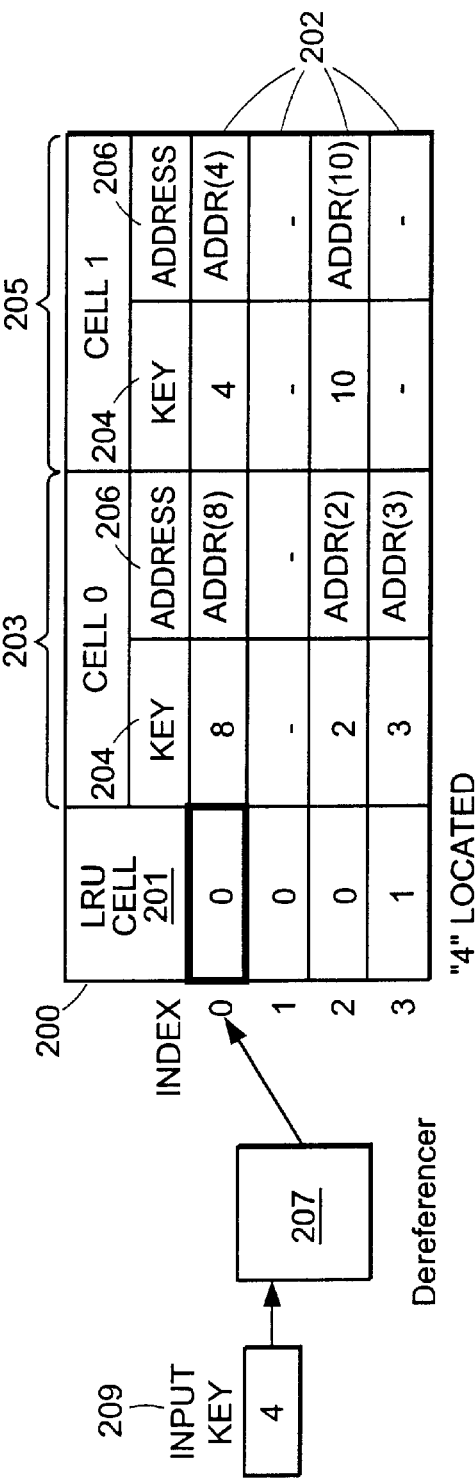

In FIG. 3H, the page identified by input key=4 is again accessed, and hashed to index Record 0. This time however, a key field in Record 0 is found, in Cell 1, containing the value "4", indicating that the correct address, ADDR(4) is already in Cell 1's address field 206 Therefore, the address is not retrieved by the page manager. Note, however, that the LRU cell field 201 is modified to indicate that Cell 1 is no longer the least recently used.

Figure 4:
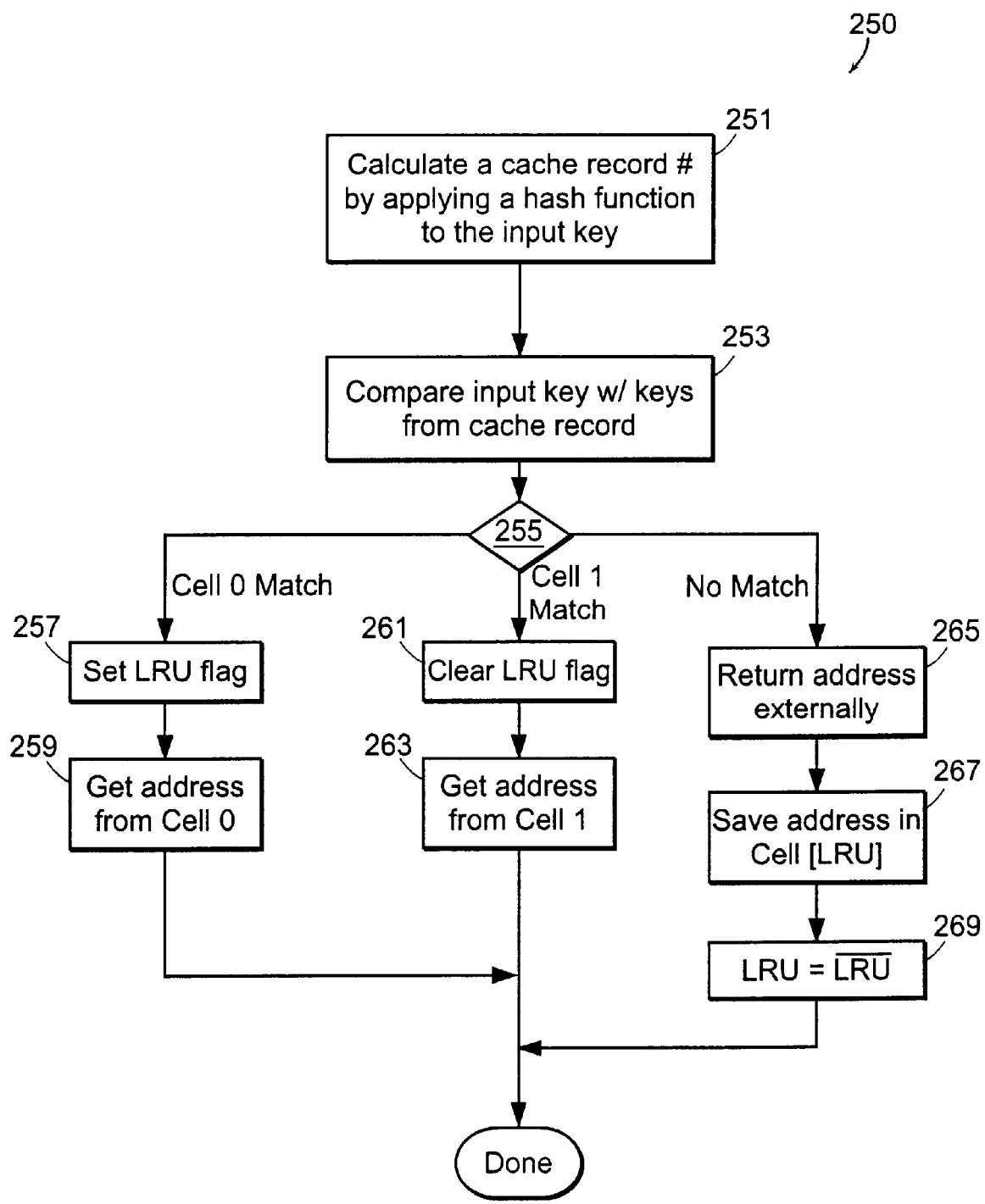
FIG. 4 is a flowchart of the procedure followed by the 2-way cache embodiment of FIGS. 3A–3H.

FIG. 4 is a flowchart 250 of the procedure followed for the 2-way cache embodiment 200 of FIGS. 3A–3H. In step 251, the page descriptor or input key is used as input to a hashing function, or dereference (207 in FIGS. 3A–3H), which produces a reference to some record 202 of the cache 200. In step 253, the input key is compared with the keys stored in Cells 0 and 1 of the indexed record. In step 255, a determination is made as to whether there is a match of the input key to Cell0 or Cell1, or if there is no match.

If there is a match with Cell0, then in step 257 the LRU cell field 201 is set to indicate that Cell 1 is now the least recently used cell within that record. In step 259, the address is retrieved from Cell0.

If, on the other hand, there is a match with the key field of Cell l of the referenced record, then in step 261, the LRU cell field is cleared to indicate that Cell0 is the least recently used cell. In step 263, the address is retrieved from Cell1.

Finally, if there is no match, then the paging manager retrieves the address in step 265, and in step 267 saves the address in the cell indicated as least recently used. In step 269, the LRU cell field 201 is inverted to indicate that the other cell is now least recently used.

One skilled in the art would recognize that data itself rather than addresses could also be cached in the present invention.

Figure 5:
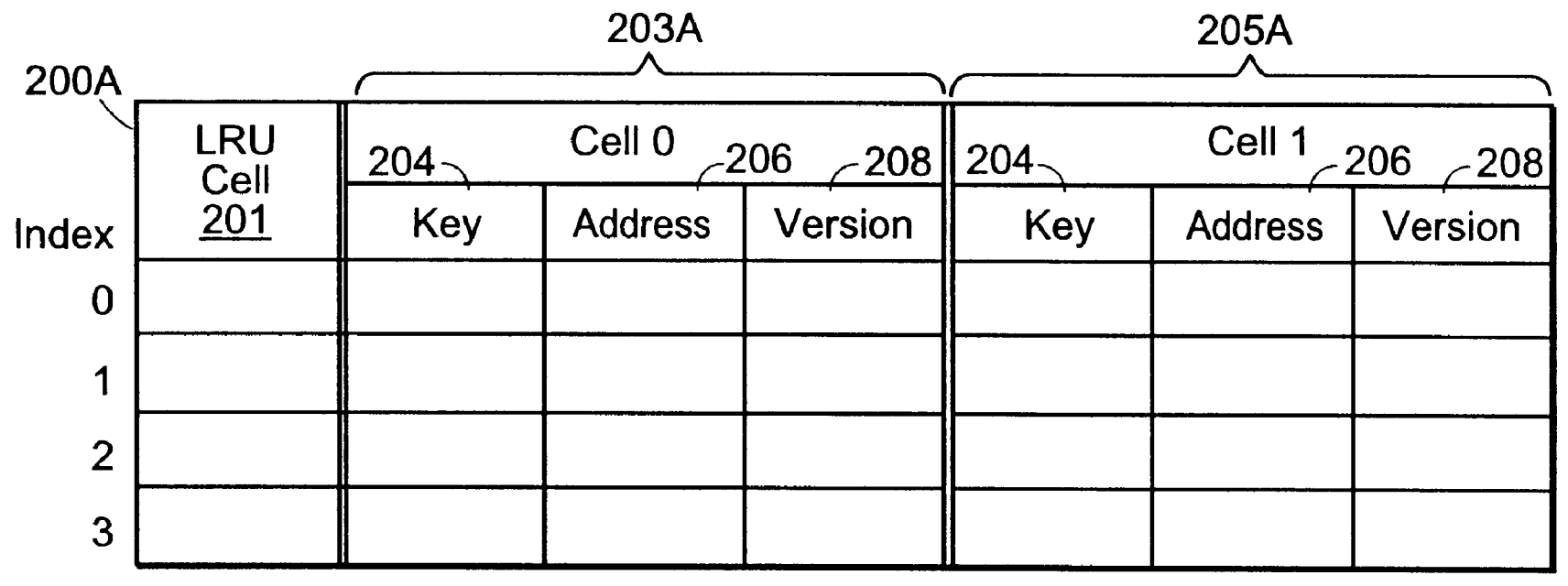

FIG. 5 illustrates a variation of the 2-way cache 200A in which each cell 203A, 205A has a version field 208 for storing a version identifier associated with the data at the corresponding address. This version field 208 can be used to validate data at the identified page or to synchronize buffers associated with different threads.

FIGS. 6A–6I illustrate a LRU cache embodiment 300. As with the embodiment of FIGS. 3A–3H, a hashing factions or dereference 301 converts the input key to an index. For this example, let the hashing function be index= key mod(8). The index references an entry in a hash table 303 which in turn provides an index to the cache buffer 305. Unlike the embodiment of FIGS. 3A–3H, this embodiment 300 has one entry entry per record 350, while each record contains several additional fields.

The key field 307, similar to that of the 2-way cache embodiment, is used for storing the key value associated with the address stored in the address field 317.

Each record 350 is chained into two doubly linked lists. The first of these chains is a hash chain, the second being the LRU chain. These chains are described by additional fields: the hash chain previous 309 and hash chain next 311, denoted H PREV and H NEXT respectively, and LRU chain previous 313 and LRU chain next 315, denoted LRU PREV and LRU NEXT respectively. These lists are described in further detail below.

The LRU chain or list provides a means for maintaining a history of which record is the least recently used. Each entry in the LRU PREV field 313 points to the record in the buffer 305 which was most recently used previous to the instant record, thus forming half of the doubly-linked LRU chain from the most recently used record, back to the least recently used record.

Similarly, each entry in the LRU NEXT field 315 points to the record in the buffer 305 which was least recently used after the instant record, thus forming the other half of the LRU chain, from the least recently used record to the most recently used record. An LRU chain 320 is illustrated in its initial state in FIG. 6A. As shown, the least recently used record 320A is Record 0, while the most recently used record 320B is Record 7. Of course, one skilled in the art would recognize that this initial ordering is arbitrary. It should be noted that the LRU chain 320 is not a separate structure but is merely shown separate for illustrative purposes, to indicate the order of the LRU chain as specified by the LRU PREV and LRU NEXT fields, 313 and 315 respectively. As with FIGS. 4A–4H, fields whose values have been updated since the previous figure are indicated with double borders.

Figure 6A:
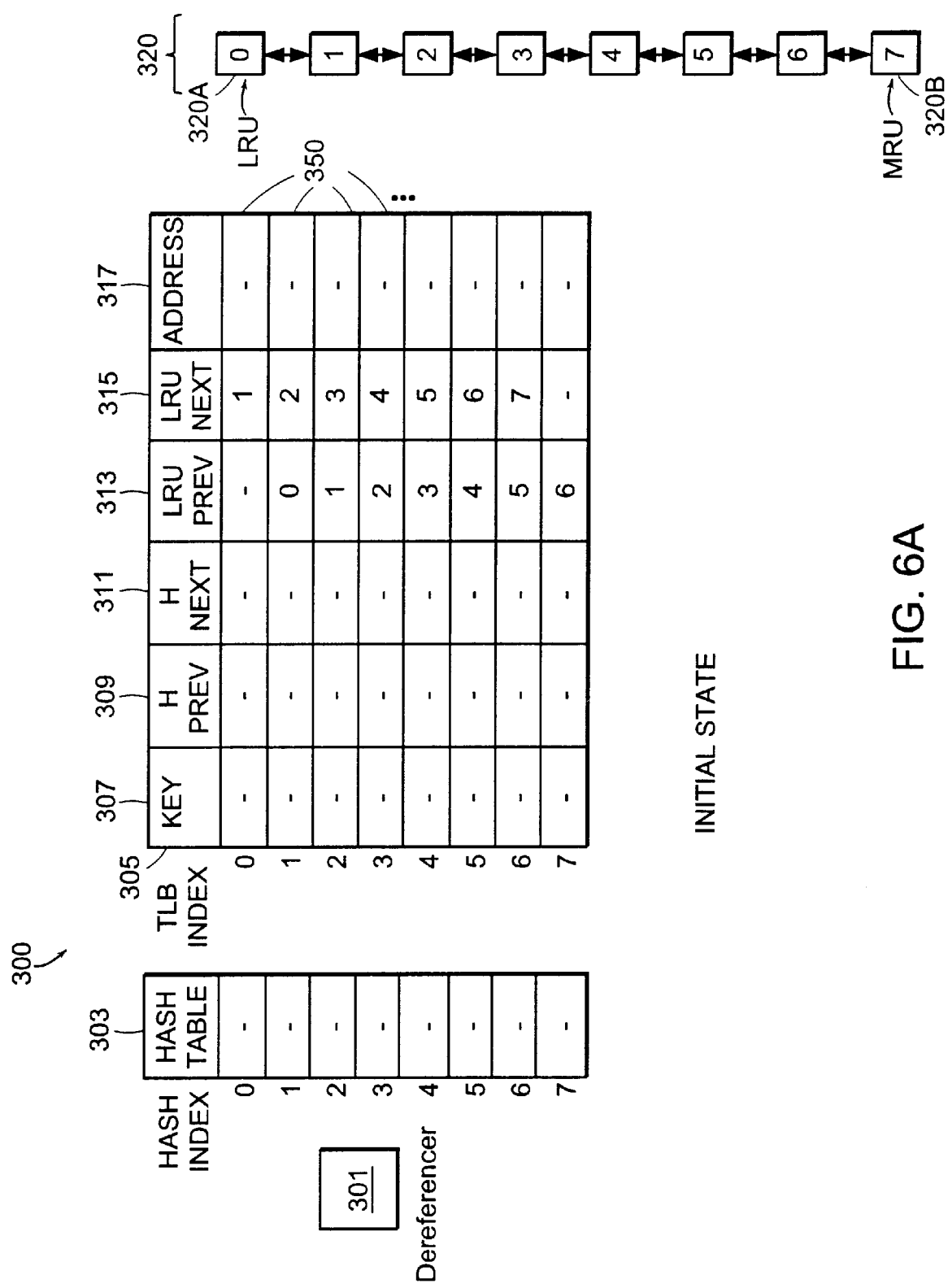
FIGS. 6A–6I illustrate a least recently used (LRU) cache embodiment.
Figure 6B:
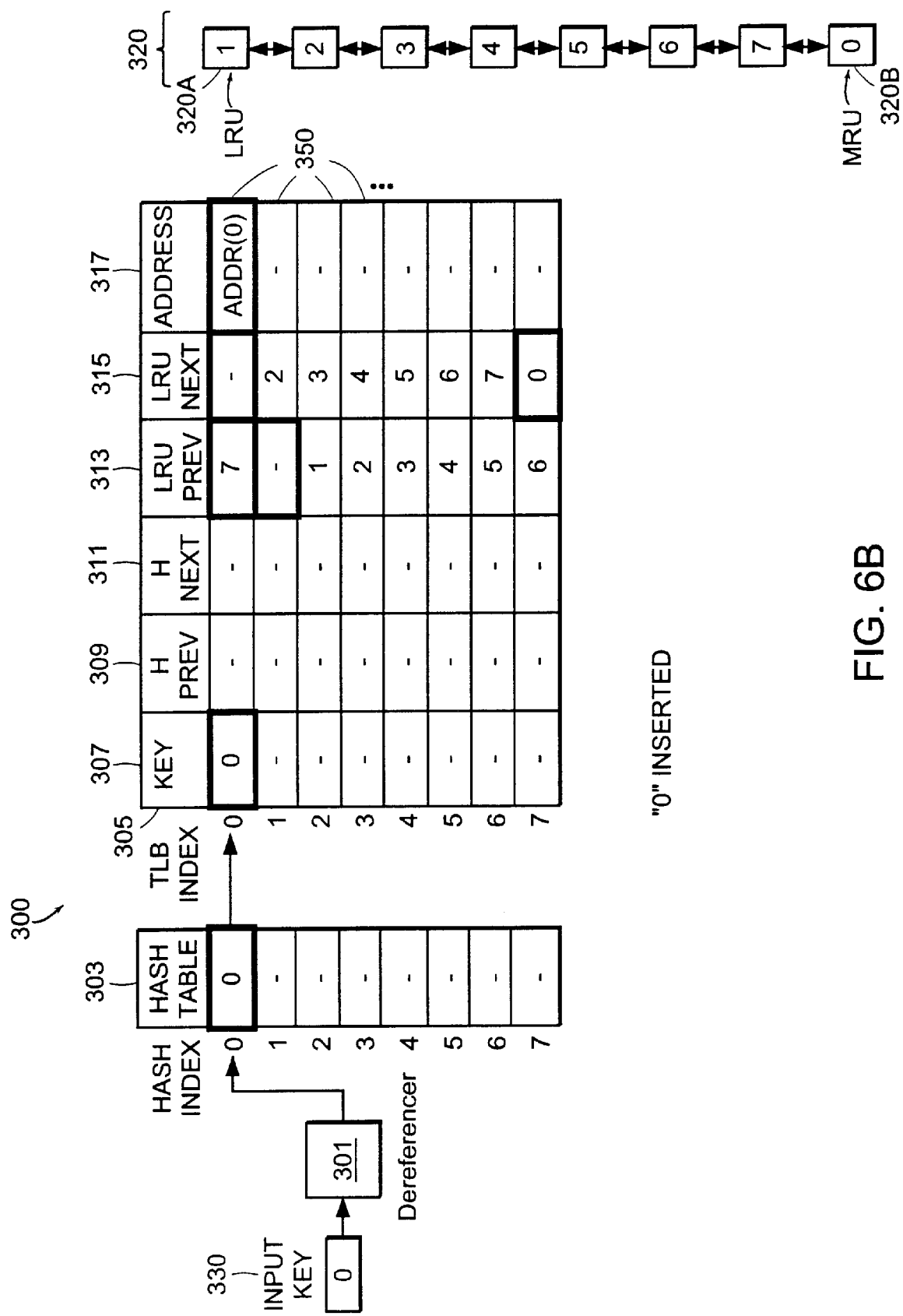

In FIG. 6B, the first input key 330 value is "0", which is hashed by the hashing function 301 to "0", pointing to entry 0 of the hash table 303. Since this entry initially holds no valid information (see FIG. 6A), the least recently used record, in this case Record 0, is assigned and the input key value "0" is stored in the first entry of the hash table 303. The paging manager 15 (FIG. 1) then retrieves the corresponding page address ADDR(0) identified by the input key=0 and stores that address in Record 0's address field 317. The key value ("0") is stored in the key field 307. The LRU PREV and LRU NEXT fields 313, 315 are then updated so that Record 0 is indicated as the most recently used record of the LRU chain 320.

Figure 6C:
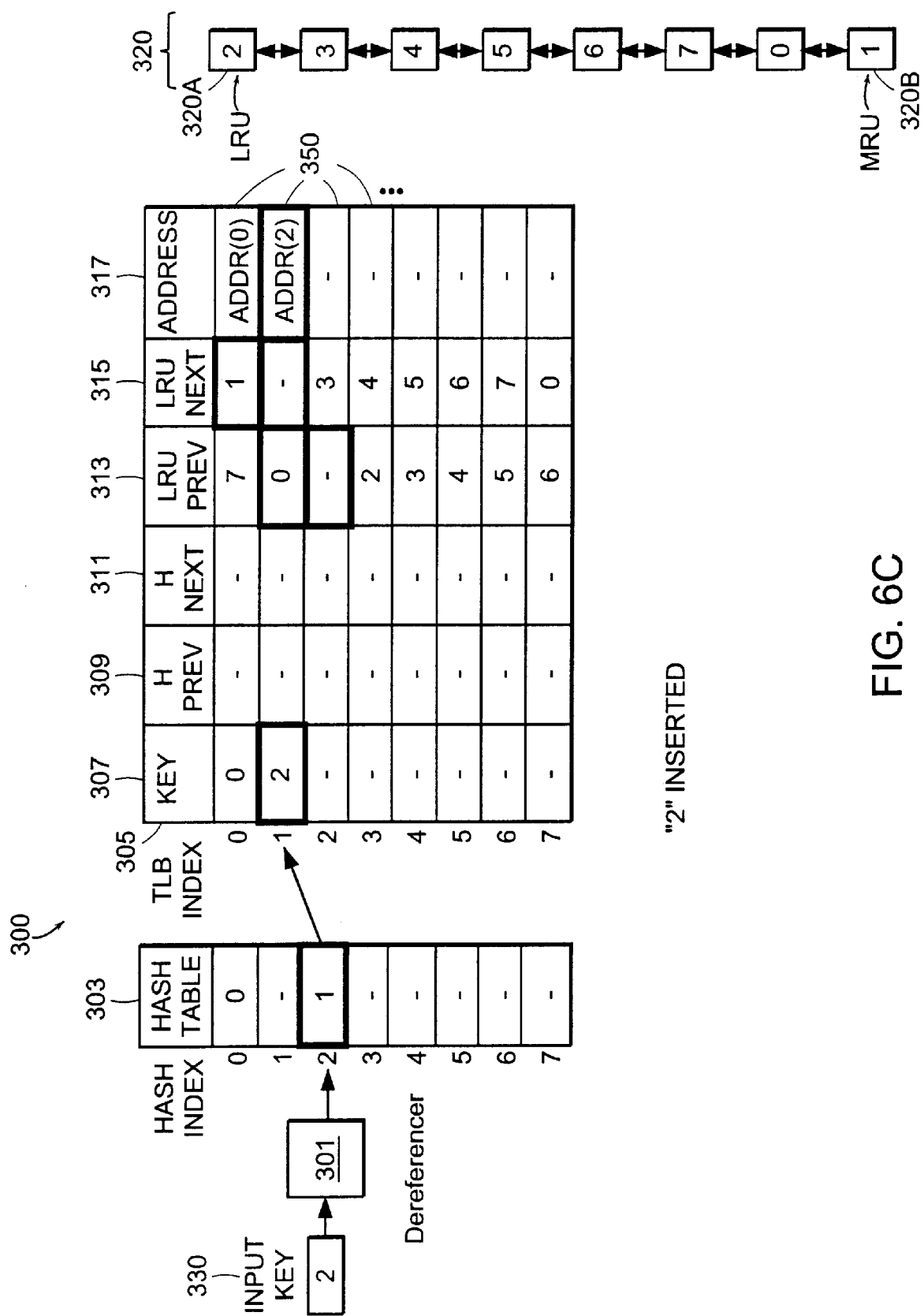

In FIG. 6C, the page described by key value=2 is accessed. Since 2 mod(8)=2, entry 2 of the hash table 303 is referenced. As with entry 0 above, entry 2 does not yet hold any valid information. Therefore, the least recently used record, i.e., Record 1, is used. A "1" is stored in entry 2 of the hash table 303, referenced by the hash of input key "2".

Again, the paging manager retrieves the address ADDR(2) corresponding to input key=2 and stores the key value "2" in the address field 317 of Record 1 of the cache buffer 305. Again, the LRU PREV and LRU NEXT fields 313, 315 are updated to indicate that Record 1 is now the most recently used 320B. Therefore, Record 2 is now the least recently used 320A.

Figure 6D:
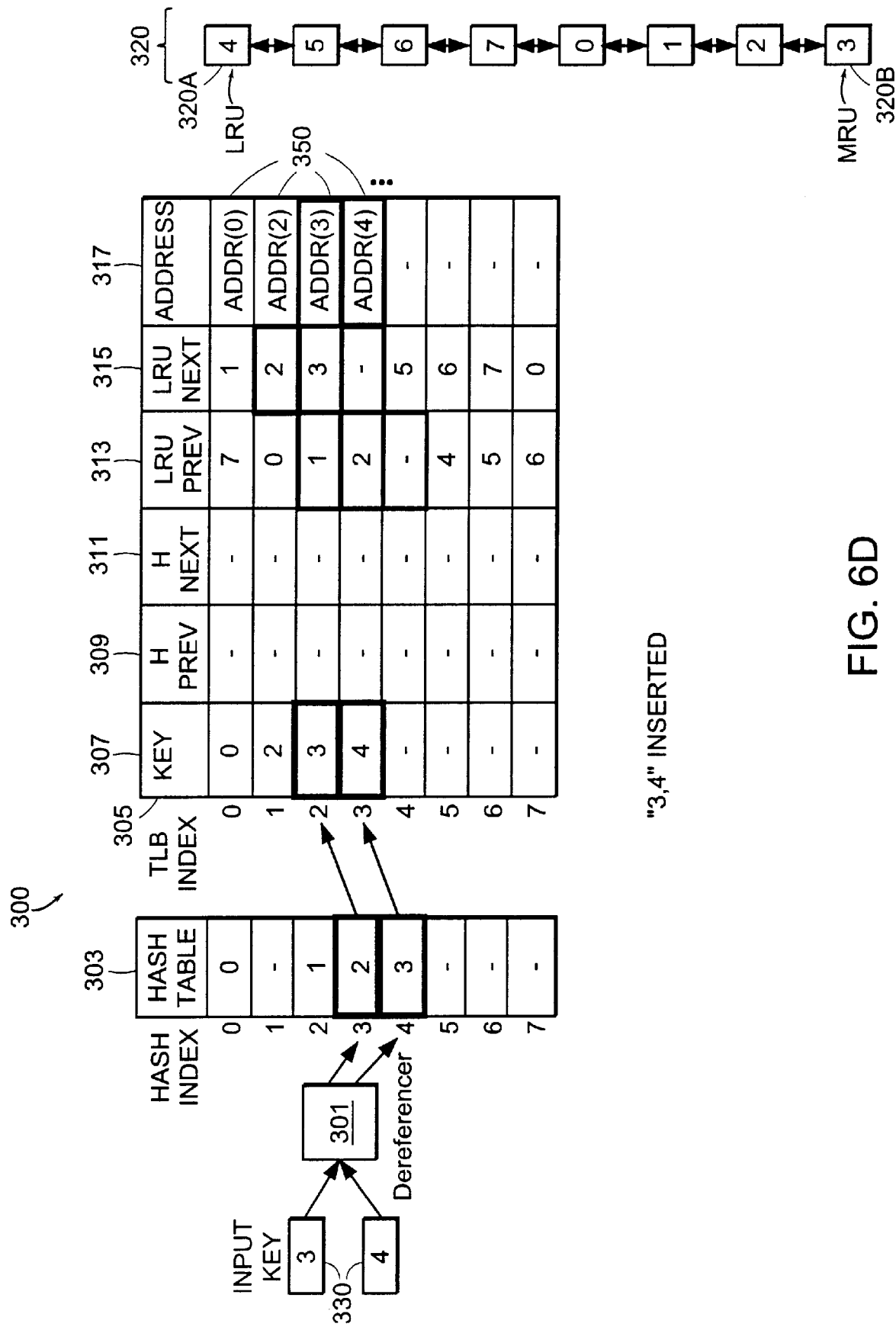

FIG. 6D illustrates the accesses of two additional pages identified by key values 3 and 4, which hash to "3" and "4" using the given hashing function 301. Retrieval of the corresponding addresses and insertion into the cache buffer along with modification of the LRU chain 320 is similar to that shown in FIGS. 6A–6C.

Figure 6E:
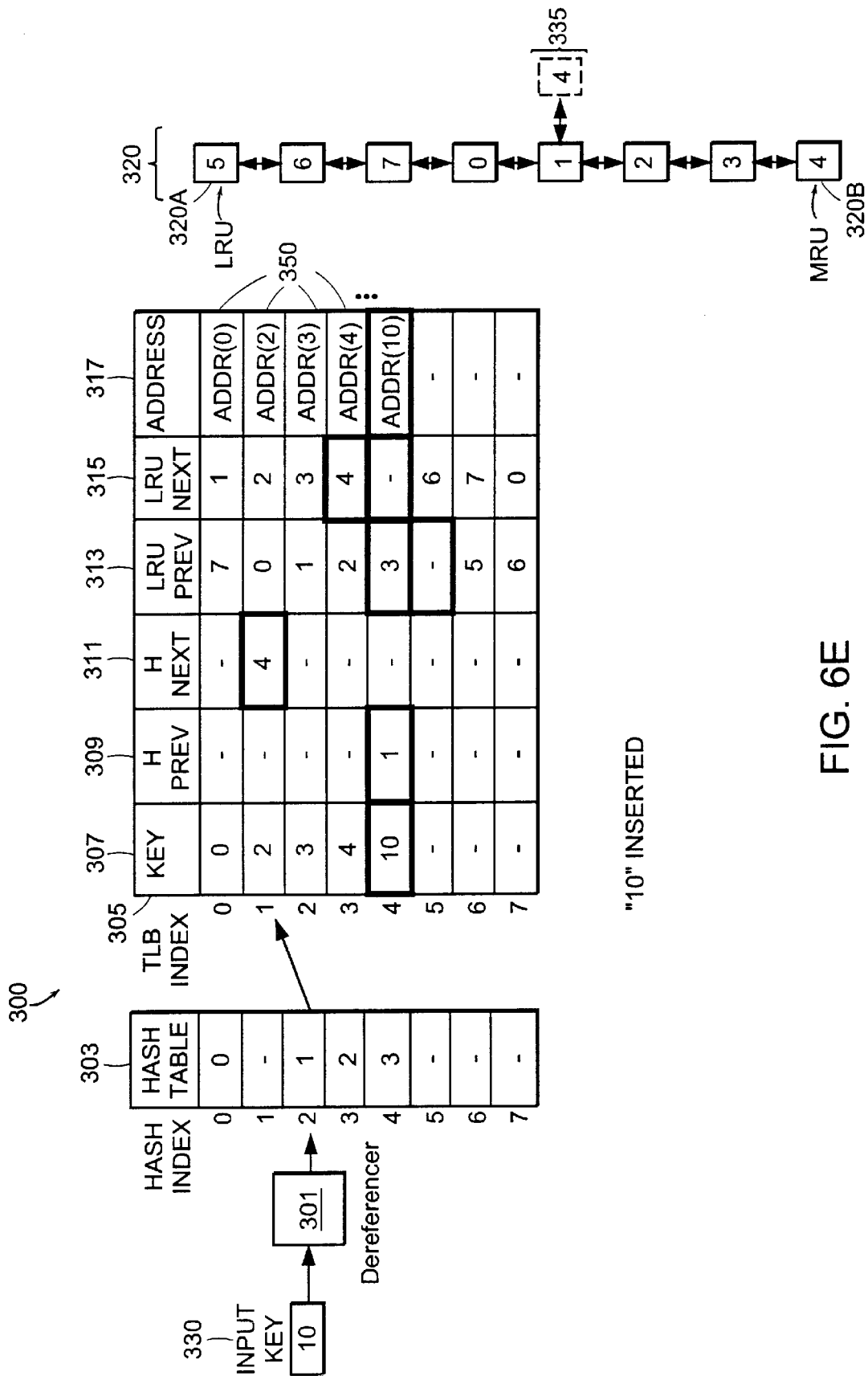

In FIG. 6E, the input key value 303 is "10". Since 10 mod(8)=2, entry 2 of the hash table 303 is referenced. Entry 2 of the hash table contains a valid index: "1", pointing to record 1 of the buffer 305. Therefore, the key value stored in Record 1's key field 307 is examined. In this example, the key field 307 holds the value "2" due to a previous access to page 2. Since this does not match the input key 303 "10", the paging manager retrieves the address corresponding to input key=10. This address ADDR(10) is stored along with the key value ("10") into address and key fields 317, 307 of the least recently used record as indicated in the LRU chain (see FIG. 6D), in this case Record 4. The LRU PREV and LRU NEXT fields 313, 315 are again updated as previously described to indicate that Record 4 is now the most recently used entry in the LRU chain 320.

Since this is the second entry corresponding to cache index "1", a hash chain is formed as indicated with dashed lines at 335. This is done, in Record 1, by indicating the next record in the hash chain in the H NEXT field 311, that is, Record 4. Similarly in the H PREV field 309 of Record 4, the record in the hash chain previous to Record 4, that is, Record 1, is indicated.

Again, the hash chain is not a separate structure, but rather is shown for exemplary purposes to illustrate the hash chain indicated within the buffer 305 by fields 309 and 311. Record 4 indicated at 335 is the same Record 4 indicated as the most recently used record at the bottom 320B of the LRU chain 320.

Figure 6F:
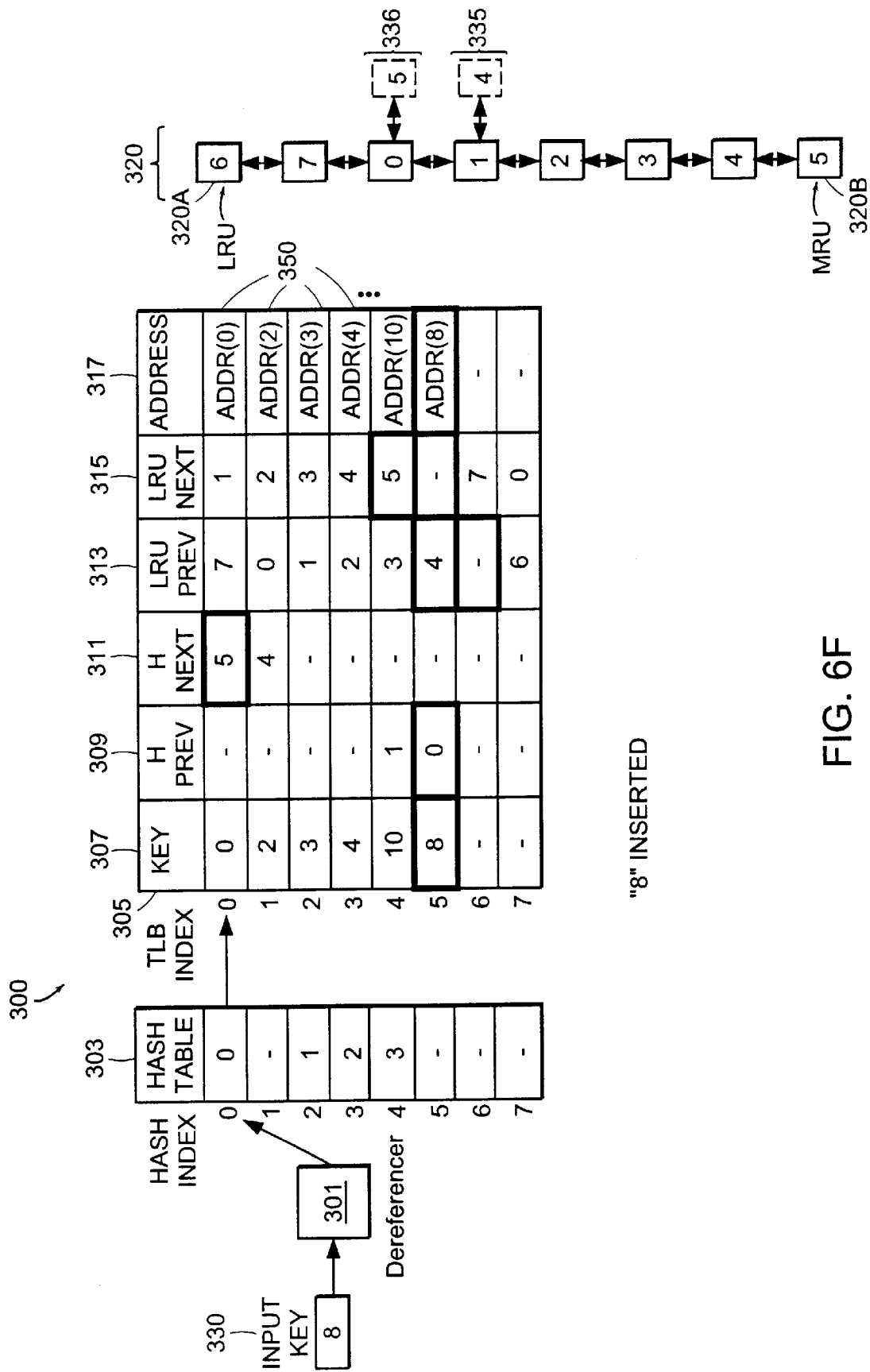

FIG. 6F illustrates an access to the page described by input key=8, which has not yet been accessed. As with FIG. 6E, this page hashes to an already used hash index (8 mod(8)=0). Therefore, Record 5, the least recently used record, is appended to the hash chain 336 which has Record 0 at its head.

Figure 6G:
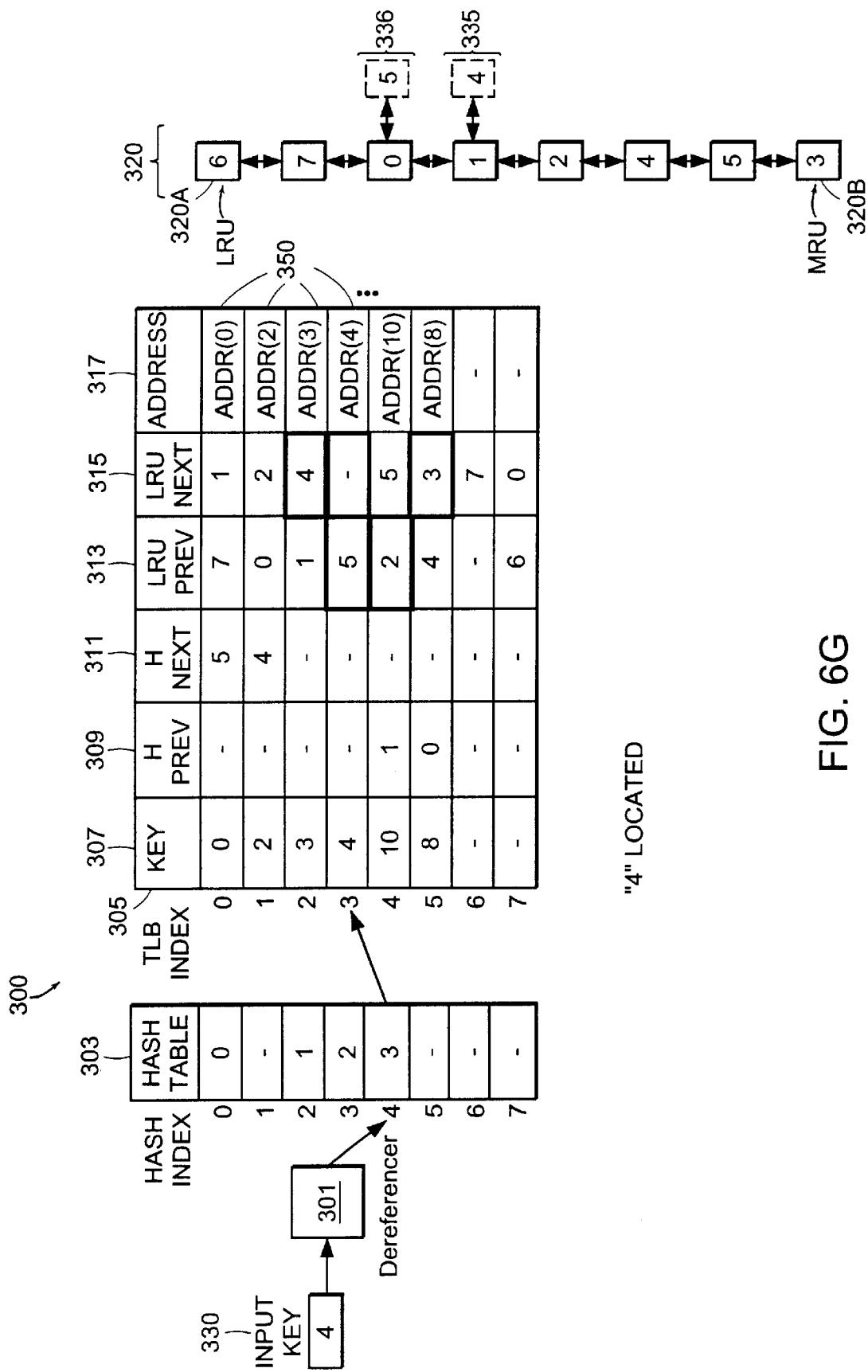

In FIG. 6G, the page identified by input key=4 is accessed. Since 4 mod(8)=4, entry 4 in the hash table 303 is read. Entry 4 contains the value "3", referencing Record 3. The key field 307 of Record 3 contains the value "4", indicating that the address ADDR(4) corresponding to input key=4 has already been retrieved by the paging manager and is stored in the address field 317 of Record 3. Therefore the address in the address field 317 can be used for this access. No further retrieval is necessary. However, the LRU chain order is updated to indicate that Record 3 is now the most recently used.

Figure 6H:

FIG. 6H illustrates two accesses to pages identified by input keys 6 and 7 respectively. Input key=6 is hashed to 6 mod(8)=6, so entry 6 in the hash table 303 is read. Entry 6 contains no information, so the least recently used record, Record 6, is assigned and the input key value "6" is stored in entry 6 of the hash table 303. The paging manager 15 (FIG. 1) retrieves the corresponding page address ADDR(6) and stores that address in Record 6's address field 317. The key value "6" is stored in the key field 307, and the LRU PREV and LRU NEXT fields 313, 315 are then updated so that Record 6 is indicated at the most recently used record of the LRU chain 320.

Similarly, input key=7 hashes to 7 mod(8)=7, so entry 7 in the has table 303 is read. Entry 7 contains no information, so the least recently used record, Record 7, is assigned and the input key value "7" is stored in entry 7 of the hash table 303. The paging manager 15 (FIG. 1) retrieves the corresponding page address ADDR(7) and stores that address in Record 7's address field 317. The key value "7" is stored in the key field 307, and the LRU PREV and LRU NEXT fields 313, 315 are then updated so that Record 7 is indicated at the most recently used record of the LRU chain 320.

Figure 6I:
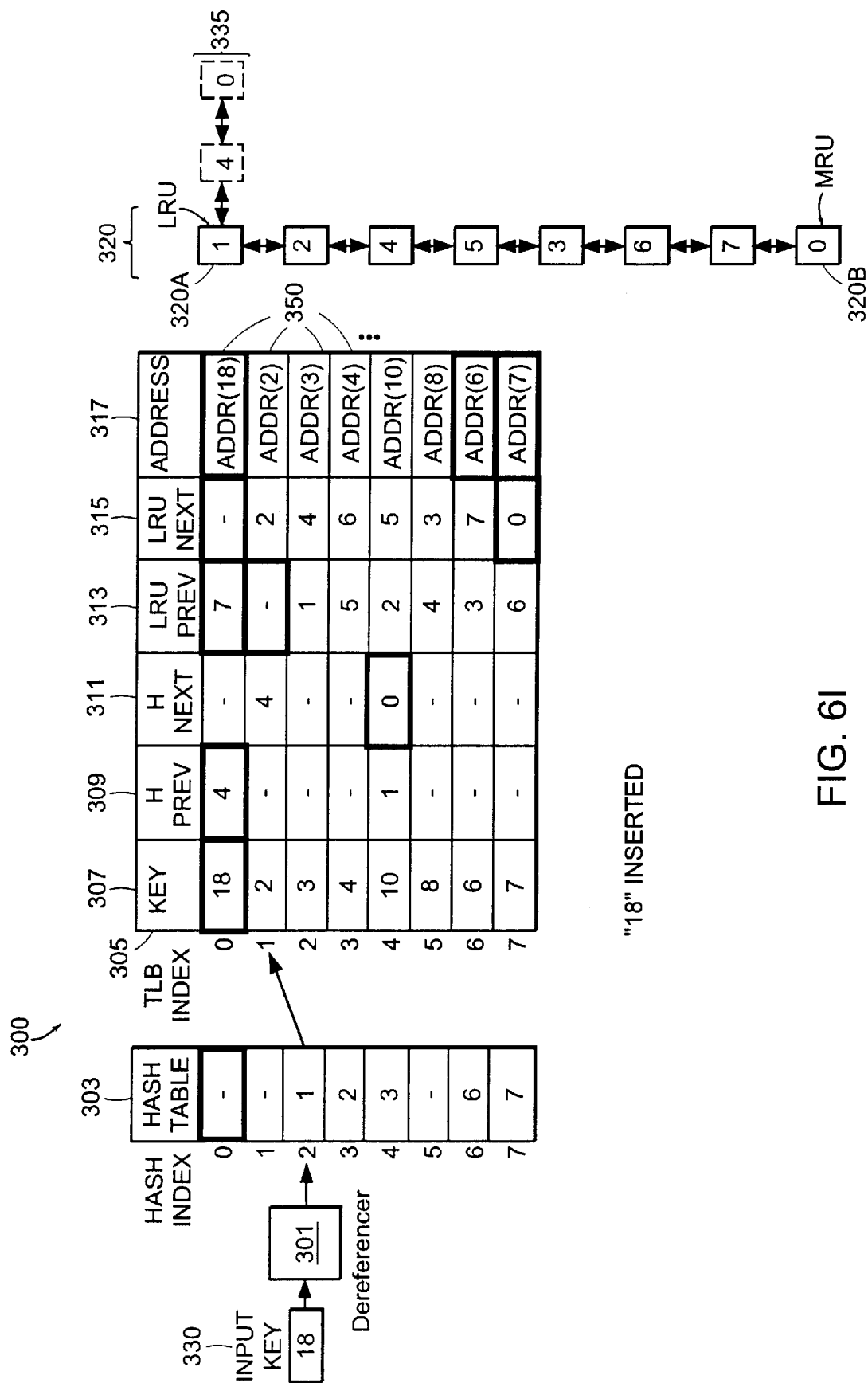

FIG. 6I illustrates an access to a page identified by input key=18. The hashing function 301 hashes the input key 330 to the value "2", thereby indexing entry 2 in the hash table 303. Entry 2 holds the value "1", thus referencing Record 1. The key field 307 of Record 1 holds the value "2". As indicated by the H NEXT field 311, Record 1 is the first record of the hash chain 335, followed by Record 4 which holds key value Since no match is found, the page manager retrieves an address for key value "18" and stores that address ADDR (18) into the address field 317, and the value "18" in the key field 307 for the currently least recently used record, which, referring back to FIG. 6H, is Record 0. Record 0 is then placed on the hash chain 335 after Record 4 by updating the appropriate H PREV and H NEXT fields 309, 311. As a result, Record 0 is no longer in the hash chain 336 of FIG. 6H.

In addition, Record 0 is moved to the most recently used location 320B of the LRU chain 320. In addition, since Record 0 is now associated for hash table entry 2, hash table entry 0, with which Record 0 was previously associated (see FIG. 6I), is invalidated in the hash table 303.

Figure 7:
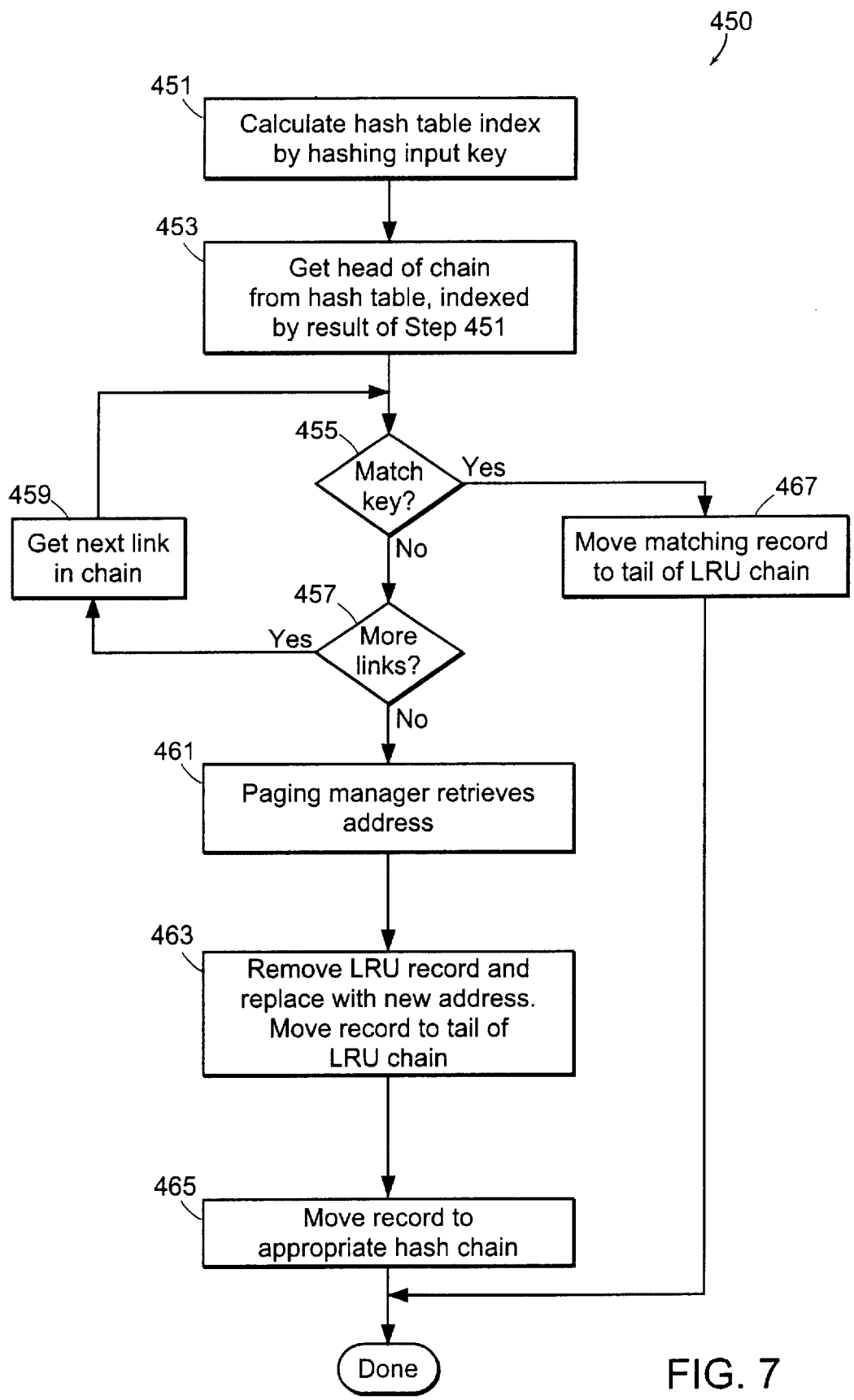
FIG. 7 is a flowchart illustrating the operation of the LRU cache embodiment of FIGS. 6A–6I.

FIG. 7 is a flow chart 450 illustrating the operation of the LRU cache embodiment 400 of FIGS. 6A–6I. In step 451, a hash table index is calculated from the input key 330 by using a hashing or dereferencing factions 301, for example, index=key mod(8), as used in the illustrative example of FIGS. 6A–6I. In step 453, the head of the hash chain indicated by the indexed hash table entry is retrieved, the entry in turn referencing a specific record within the buffer 305. At step 455 the input key 330 is compared with the value stored in the key field 307 of the referenced record. If there is no match, then in step 457, it is determined whether there are any more links in the chain. If there are, then at step 459, the next link in the hash chain, referenced by the H NEXT field 311, is examined. The loop comprising steps 455–459 repeats until either a match is found or until no more links are left.

If no match has been found when the end of the hash chain is encountered, then at step 461 the page manager retrieves the data or address corresponding to the input key. In step 463, the least recently used record is moved from the head of the LRU chain 320 to its tail to indicate it is the most recently used record. At step 465, the record is moved to the appropriate hash chain by updating the H PREV and H NEXT 309, 311 fields respectively, of the appropriate records.

FIG. 8 is a flow chart 450 illustrating the operation of the LRU cache embodiment 400 of FIGS. 6A–6I. In step 451, a hash table index is calculated from the input key 330 by using a hashing or dereferencing function 301, for example, index=key mod(8), as used in the illustrative example of FIGS. 6A–6I. In step 453, the head of the hash chain indicated by the indexed hash table entry is retrieved, the entry in turn referencing a specific record within the buffer 305. At step 455 the input key 330 is compared with the value stored in the key field 307 of the referenced record. If there is no match, then in step 457, it is determined whether there are any more links in the chain. If there are, then at step 459, the next link in the hash chain, referenced by the H NEXT field 311, is examined. The loop comprising steps 455–459 repeats until either a match is found or until no more links are left.

If no match has been found when then end of hash chain is encountered, then at step 461 the page manager retrieves the data or address corresponding to the input key. In step 463, the least recently used record is moved from the head of the LRU chain 320 to its tail to indicate it is the most recently used record. At step 465, the record is moved to the appropriate hash chain by updating the H PREV and H NEXT 309, 311 fields respectively, of the appropriate records.

If, at step 455, a match is found, then at step 467 the matching record is moved to the tail of the LRU chain 320, indicating that it is now the most recently used link in the LRU chain 320B. The address stored in the address field 317 is used immediately and there is no need for retrieval by the page manager.

It should be noted that a common practice in caching systems is to keep only a portion of a key in a record in cache. For example, suppose a key comprises eight bits and the hash function is mod 16. The hash record identifier thus comprises the last four bits of the key. Therefore, only the first four bits of the key need to be retained in the cache record. Such techniques can be used in implementing the described paging system.

While this invention has been particularly shown and described with references to particular embodiments thereof, it will be understood by those skilled in the art that various changes in form and details may be made therein without departing from the scope of the invention encompassed by the appended claims.

What is claimed is:

1. A method of translating, in a software paging system, an input key to an address in main memory, comprising:

in the main memory, creating a translation buffer having a plurality of records stored therein, each record having a plurality of translation entries, each translation entry comprising:
    a key field comprising at least a portion of a key identifying a page in the main memory,
    an address field associated with the key field and having an address of the page identified by the key, and
    a version field;
upon saving an address in the address field of a translation entry, saving a version identifier in the version field of the translation entry;
incrementing the version identifier each time a different virtual page is associated with the saved address;
from the input key, dereferencing a record in the translation buffer;
comparing the input key with the keys stored in the dereferenced record;
if the input key matches a key from the dereferenced record,
    retrieving an address from the associated address field,
    comparing the version identifier of the corresponding translation entry with a last retrieved version identifier for the same input key, and
    retrieving data from the page associated with the retrieved address only if the version identifiers match; and
if the input key does not match any key from the dereferenced record, invoking a paging manager to establish an address for the input key, and saving the input key and the established address in the key field and associated address field, respectively, of a translation entry of the dereferenced record.

2. The method of claim 1 wherein the input key comprises a context and a page number.

3. The method of claim 2 wherein the context comprises a database number and a page space number.

4. The method of claim 1, further comprising:
updating a least recently used indicator associated with the dereferenced record to indicate a least recently used order of memory pages addressed in the dereferenced record.

5. The method of claim 4 wherein each record has two translation entries, and the least recently used indicator is a single bit.

6. The method of claim 1 further comprising, in a multithreaded system, associating each thread with its own translation buffer.

7. The method of claim 1, wherein dereferencing a record comprises applying a hashing function to the input key to obtain a pointer to the dereferenced record.

8. A system for translating, in a software paging system, an input key to a main memory address, comprising:
a translation buffer in the main memory having a plurality of records stored therein, each record having a plurality of translation entries, each translation entry comprising:
a key field comprising at least a portion of a key identifying a page in the main memory,
an address field associated with the key field and having an address of the identified page, and
a version field, wherein when an address is saved in the address field of a translation entry, a version identifier is saved in the version field of the translation entry, the version identifier being incremented each time a different virtual page is associated with the saved address;
a dereferencer which, from the input key, dereferences a record; and
a translator which searches the dereferenced record for a match with the input key, and which retrieves an address from the address field of a translation entry of the dereferenced record, the translation entry having a key field that matches the input key, wherein upon said input key match, data is retrieved from the page associated with the retrieved address only if the version identifier of the corresponding translation entry matches a last retrieved version identifier for the same input key;
a paging manager which, if no match is found, establishes an address for the input key, wherein the input key and the established address are stored in a translation entry of the dereferenced record.

9. The system of claim 8 wherein the input key comprises a context and a page number.

10. The system of claim 9 wherein the context comprises a database number and a page space number.

11. The system of claim 8, further comprising:
an indicator associated with each respective record to indicate a least recently used order of memory pages addressed in the dereferenced record.

12. The system of claim 11 wherein each record has two translation entries, and the least recently used indicator is a single bit.

13. The system of claim 8, wherein the system is a multithreaded system, each thread in the multithreaded system being associated with its own translation buffer.

14. The system of claim 8, wherein the dereference comprises a hashing function.

15. A method of translating, in a software paging system, an input key to a main memory address, comprising:
creating a table having a plurality of entries, each entry referencing a respective chain of translation records in a translation buffer in the main memory, each chain being associated with a plurality of keys, and each translation record comprising:
a key field comprising at least a portion of a key identifying a page in the main memory, and
an associated address field having an address of the identified page;
dereferencing, from the input key, a chain of translation records associated with the input key;
searching through the dereferenced chain until a translation record key matches the input key;
upon finding a match, retrieving an address from the address field of the translation record having the matching key, and indicating the translation record as most recently used; and
creating a least recently used (LRU) chain of translation records, ordered by most recent use, the chain providing an indication of most recently used and least recently used translation records.

16. The method of claim 15, further comprising:
if no match is found,
invoking a page manager to establish an address corresponding to the input key,
saving the address in an address field of a least recently used translation record, and indicating the translation record as most recently used, and
placing the translation record into the chain associated with the input key.

17. The method of claim 15 wherein dereferencing a chain comprises applying a hashing function to the input key to obtain an index value referencing the dereferenced chain.

18. The method of claim 15 wherein each chain comprises a doubly-linked list.

19. The method of claim 15, wherein each translation record additionally has a version field, further comprising:
upon saving the address in the address field of a translation record, saving a version identifier in the version field of the translation record;
incrementing the version identifier each time a different virtual page is associated with the address is changed;
upon an input key match, comparing the version identifier of the corresponding translation record with a last retrieved version identifier for the same input key; and
retrieving the data from the page associated with the address only if the version identifiers match.

20. The method of claim 15 wherein the input key comprises a context and a page number.

21. The method of claim 20 wherein the context comprises a database number and a page space number.

22. The method of claim 15, further comprising, in a multithreaded system, associating each thread in the multithreaded system with its own translation buffer.

23. A system for translating, in a software paging system, an input key to a main memory address, comprising:
a translation buffer in the main memory comprising a plurality of translation records, each valid translation record belonging to one of a plurality of chains, and each translation record comprising:
a key field comprises at least a portion of a key identifying a page in the main memory, and an address field associated with the key field and having an address of the identified page, each chain being associated with a plurality of keys;

a dereferencer which, from the input key, dereferences a chain of translation records;

searching means for searching the dereferenced chain for a translation record having a key which matches the input key, and which upon finding a match, retrieves an address from the address field of the matching translation, wherein the matching translation record is indicated as most recently used; and a list, ordered by recent use, of translation records, to indicate most recently used and least recently used translation records.

24. The system of claim 23, further comprising a page manager, which, if no match is found, establishes an address corresponding to the input key, wherein the input key and the established address are saved in a least recently used translation record, the least recently used translation record then being indicated as most recently used and placed into the chain associated with the input key.

25. The system of claim 23 wherein each chain comprises a doubly-linked list.

26. The system of claim 23, wherein each translation entry further comprises a version field, wherein when the address is saved in the address field of a translation record, a version identifier is saved in the version field of the translation entry, the version identifier being incremented each time a different virtual page is associated with the address, such that upon an input key match, the data is retrieved from the page associated with the address only if the version identifier of the corresponding translation record matches a last retrieved version identifier for the same input key.

27. The system of claim 23 wherein the input key comprises a context and a page number.

28. The system of claim 27 wherein the context comprises a database number and a page space number.

29. The system of claim 23 wherein the system is a multithreaded system, each thread in the multithreaded system being associated with its own translation buffer.

30. The system of claim 23, wherein the dereferencer comprises a hashing function.

31. A method of translating, in a multi-threaded, software paging system, an input key to a corresponding memory address, comprising:

allocating a plurality of translation lookaside buffers in main memory, each translation lookaside buffer being associated with a thread of execution; and implementing translation lookaside buffer operation with software, such that, within a thread of execution, upon presentation of an input key to the associated translation lookaside buffer, the corresponding memory address is returned, and if the corresponding address was not found in the buffer, it is determined by a paging manager and stored in the associated buffer;

wherein each memory page is associated with a version identifier which is updated each time a different virtual page is associated with the memory page, and wherein each entry in each translation lookaside buffer comprises a version field indicative of the version of the memory page when last accessed by the associated thread, the method further comprising:

comparing the version identifier associated with the retrieved memory address with a last retrieved version identifier for the input key; and retrieving the data from the page associated with the address only if the version identifiers match.

32. The method of claim 31 wherein the input key is a page descriptor comprising a context identifier and a page identifier.

33. A method of translating, in a software paging system, an input key to a memory address, comprising:

creating a table having a plurality of entries, each entry referencing a respective chain of translation records in a main memory translation buffer, each chain being associated with a plurality of keys, and each translation record comprising:

a key field comprising at least a portion of a key identifying a page, and an associated address field having an address of the identified page;

dereferencing, from the input key, a chain of translation records associated with the input key;

searching through the dereferenced chain until a translation record key matches the input key;

upon finding a match, retrieving an address from the address field of the translation record having the matching key, and indicating the translation record as most recently used;

each translation record additionally having a version field, the method further comprising:

upon saving the address in the address field of a translation record, saving a version identifier in the version field of the translation record;

incrementing the version identifier each time a different virtual page associated with the address is changed;

upon an input key match, comparing the version identifier of the corresponding translation record with a last retrieved version identifier for the same input key; and retrieving the data from the page associated with the address only if the version identifiers match.

34. A system for translating, in a software paging system, an input key to a main memory address, comprising:

a translation buffer in the main memory comprising a plurality of translation records, each valid translation record belonging to one of a plurality of chains, each translation record comprising:

a key field comprises at least a portion of a key identifying a page in the main memory, and an address field associated with the key field and having an address of the identified page, each chain being associated with a plurality of keys;

a dereferencer which, from the input key, dereferences a chain of translation records;

searching means for searching the dereferenced chain for a translation record having a key which matches the input key, and which upon finding a match, retrieves an address from the address field of the matching translation record, wherein the matching translation record is indicated as most recently used; and each translation record further comprising a version field, wherein when the address is saved in the address field of a translation record, a version identifier is saved in the version field of the translation record, the version identifier being incremented each time a different virtual page is associated with the address, such that upon an input key match, the data is retrieved from the page associated with the address only if the version identifier of the corresponding translation record matches a last retrieved version identifier for the same input key.

35. A method for accessing, in a software paging system, requested data from a database, the method comprising:
   translating an input key to a memory address of the requested data using a translation buffer in main memory, the translation buffer having a plurality of records stored therein, each record having a plurality of translation entries, each translation entry comprising:
      a key field comprising at least a portion of a key identifying data, and
      an address field associated with the key field and having an address of the data identified by the key,
      the input key being compared with the keys stored in the translation buffer,
      the input key being translated to an address field associated with a key matching the input key; and
   retrieving the requested data responsive to an address from the associated address field.

36. A computer program product for translating, in a software paging system, an input key to an address in main memory, the computer program product comprising a computer usable medium having computer readable code thereon, including program code which:
   creates, in the main memory, a translation buffer having a plurality of records stored therein, each record having a plurality of translation entries, each translation entry comprising:
      a key field comprising at least a portion of a key identifying a page in the main memory, and
      an address field associated with the key field and having an address of the page identified by the key, and
      a version field;
   saves a version identifier in the version field of a translation entry upon saving an address in the address field of the translation entry;
   increments the version identifier each time a different virtual page is associated with the saved address;
   dereferences, from the input key, a record in the translation buffer;
   compares the input key with the keys stored in the dereferenced record; and
   if the input key matches a key from the dereferenced record,
      retrieves an address from the associated address field,
      compares the version identifier of the corresponding translation entry with a last retrieved version identifier for the same input key, and
      retrieves data from the page associated with the retrieved address only if the version identifiers match; and
   if the input key does not match any key from the dereferenced record, invokes a paging manager to establish an address for the input key, and saving the input key and the established address in the key field and associated address field, respectively, of a translation entry of the dereferenced record.

37. The computer program product of claim 36 wherein the input key comprises a context and a page number.

38. The computer program product of claim 37 wherein the context comprises a database number and a page space number.

39. The computer program product of claim 36, further comprising program code which:

updates a least recently used indicator associated with the dereferenced record to indicate a least recently used order of memory pages addressed in the dereferenced record.

40. The computer program product of claim 39 wherein each record has two translation entries, and the least recently used indicator is a single bit.

41. The computer program product of claim 36 further comprising program code which, in a multithreaded system, associates each thread with its own translation buffer.

42. The computer program product of claim 36, wherein the program code dereferences a record by applying a hashing function to the input key to obtain a pointer to the dereferenced record.

43. A computer program product for translating, in a software paging system, an input key to a main memory address, the computer program product comprising a computer usable medium having computer readable code thereon, including program code which:
   creates a table having a plurality of entries, each entry referencing a respective chain of translation records in a translation buffer in the main memory, each chain being associated with a plurality of keys, and each translation record comprising:
      a key field comprising at least a portion of a key identifying a page in the main memory, and
      an associated field address field having an address of the identified page;
   dereferences, from the input key, a chain of translation records associated with the input key;
   searches through the dereferenced chain until a translation record key matches the input key;
   upon finding a match, retrieves an address from the address field of the translation record having the matching key, and indicates the translation record as most recently used; and
   creates a least recently used (LRU) chain of translation records, ordered by most recent use, the chain providing an indication of most recently used and least recently used translation records.

44. The computer program product of claim 43, further comprising program code which:
   if no match is found,
      invokes a page manager to establish an address corresponding to the input key,
      saves the address in an address field of at least recently used translation record, and indicates the translation record as most recently used, and
      places the translation record into the chain associated with the input key.

45. The computer program product of claim 43 wherein the computer program code dereferences a chain by applying a hashing function to the input key to obtain an index value referencing the dereferenced chain.

46. The computer program product of claim 43 wherein each chain comprises a doubly-linked list.

47. The computer program product of claim 43, wherein each translation record additionally has a version field, the computer program product further comprising program code which:
   upon saving the address in the address field of a translation record, saves a version identifier in the version field of the translation record;
   increments the version identifier each time a different virtual page is associated with the address is changed;
   upon an input key match, compares the version identifier of the corresponding translation record with a last received version identifier for the same input key; and retrieves the data from the page associated with the address only if the version identifiers match.

48. The computer program product of claim 43 wherein the input key comprises a context and a page number.

49. The computer program product of claim 48 wherein the context comprises a database number and a page space number.

50. The computer program product of claim 43, further comprising program code which associates each thread in a multithreaded system with its own translation buffer.

51. A computer program product for translating, in a software paging system, an input key to a memory address, the computer program product comprising a computer usable medium having computer readable code thereon, including program code which:
creates a table having a plurality of entries, each entry referencing a respective chain of translation records in a main memory translation buffer, each chain being associated with a plurality of keys, and each translation record comprising:
a key field comprising at least a portion of a key identifying a page,
an associated address field having an address of the identified page, and
a version field;
dereferences, from the input key, a chain of translation records associated with the input key;
searches through the dereferenced chain until a translation record key matches the input key;
upon finding a match, retrieves an address from the address field of the translation record having the matching key, and indicates the translation record as most recently used;
upon saving the address in the address field of a translation record, saves a version identifier in the version field of the translation record;
increments the version identifier each time a different virtual page associated with the address is changed;
upon an input key match, compares the version identifier of the corresponding translation record with a last retrieved version identifier for the same input key; and
retrieves the data from the page associated with the address only if the version identifiers match.

52. A method of translating, in a software paging system, an input key to an address in main memory, comprising:
in the main memory, creating a translation buffer having a plurality of records stored therein, each record having a plurality of translation entries, each translation entry comprising:
a key field comprising at least a portion of a key identifying a page in the main memory, and
an address field associated with the key field and having an address of the page identified by the key;
from the input key, dereferencing a record in the translation buffer;
comparing the input key with the keys stored in the dereferenced record;
if the input key matches a key from the dereferenced record, retrieving an address from the associated address field; and
updating a least recently used indicator associated with the dereferenced record to indicate a least recently used order of memory pages addressed in the dereferenced record, wherein each record has two translation entries, and the least recently used indicator is a single bit.

53. The method of claim 52 wherein the input key comprises a context and a page number.

54. The method of claim 53 wherein the context comprises a database number and a page space number.

55. The method of claim 52 further comprising, in a multithreaded system, associating each thread with its own translation buffer.

56. The method of claim 52, wherein dereferencing a record comprises applying a hashing function to the input key to obtain a pointer to the dereferenced record.

57. A system for translating, in a software paging system, an input key to an address in main memory, comprising:
means for creating, in the main memory, a translation buffer having a plurality of records stored therein, each record having a plurality of translation entries, each translation entry comprising:
a key field comprising at least a portion of a key identifying a page in the main memory,
an address field associated with the key field and having an address of the page identified by the key, and
a version field,
means for saving, upon saving an address in the address field of a translation entry, a version identifier in the version field of the translation entry;
means for incrementing the version identifier each time a different virtual page is associated with the saved address;
means for dereferencing, from the input key, a record in the translation buffer;
means for comparing the input key with the keys stored in the dereferenced record;
means for retrieving an address from the associated address field if the input key matches a key from the dereferenced record,
means for comparing the version identifier of the corresponding translation entry with a last retrieved version identifier for the same input key, and
means for retrieving data from the page associated with the retrieved address only if the version identifiers match; and
means for invoking, if the input key does not match any key from the dereferenced record, a paging manager to establish an address for the input key, and saving the input key and the established address in the key field and associated address field, respectively, of a translation entry of the dereferenced record.

58. The system of claim 57 wherein the input key comprises a context and a page number.

59. The system of claim 58 wherein the context comprises a database number and a page space number.

60. The system of claim 57, further comprising:
means for updating a least recently used indicator associated with the dereferenced record to indicate a least recently used order of memory pages addressed in the dereferenced record.

61. The system of claim 60 wherein each record has two translation entries, and the least recently used indicator is a single bit.

62. The system of claim 57 further comprising:
means for associating each thread in a multithreaded system with its own translation buffer.

63. The system of claim 57, wherein the means for dereferencing a record comprises:
means for applying a hashing function to the input key to obtain a pointer to the dereferenced record.

64. A system for translating, in a software paging system, an input key to an address in main memory, comprising:
   means for creating, in the main memory, a translation buffer having a plurality of records stored therein, each record having a plurality of translation entries, each translation comprising:
      a key field comprising at least a portion of a key identifying a page in the main memory, and
      an address field associated with the key field and having an address of the page identified by the key;
   means for dereferencing, from the input key, a record in the translation buffer;
   means for comparing the input key with the keys stored in the dereferenced record;
   means for retrieving, if the input key matches a key from the dereferenced record, an address from the associated address field; and
   means for updating a least recently used indicator associated with the dereferenced record to indicate a least recently used order of memory pages address in the dereferenced record, wherein each record has two translation entries, and the least recently used indicator is a single bit.

65. The system of claim 64 wherein the input key comprises a context and a page number.

66. The system of claim 65 wherein the context comprises a database number and a page space number.

67. The system of claim 64 further comprising:
   means for associating each thread in a multithreaded system with its own translation buffer.

68. The system of claim 64, said means for dereferencing a record comprising:
   means for applying a hashing function to the input key to obtain a pointer to the dereferenced record.

69. A system for translating, in a software paging system, an input key to a main memory address, comprising:
   a translation buffer in the main memory having a plurality of records stored therein, each record having a plurality of translation entries, each translation entry comprising:
      a key field comprising at least a portion of a key identifying a page in the main memory, and
      an address field associated with the key field and having an address of the identified page;
   a dereferencer which, from the input key, dereferences a record; and
   a translator which searches the dereferenced record for a match with the input key, and which retrieves an address from the address field of a translation entry of the dereferenced record, the translation entry having a key field that matches the input key;
   an indicator associated with each respective record to indicate a least recently used order of memory pages addressed in the dereferenced record, wherein each record has two translation entries, and the least recently used indicator is a single bit.

70. The system of claim 69 wherein the input key comprises a context and a page number.

71. The system of claim 70 wherein the context comprises a database number and a page space number.

72. The system of claim 69, wherein the system is a multithreaded system, each thread in the multithreaded system being associated with its own translation buffer.

73. The system of claim 69, wherein the dereferencer comprises a hashing function.

74. A system for translating, in a software paging system, an input key to a main memory address, comprising:
   means for creating a table having a plurality of entries, each entry referencing a respective chain of translation records in a translation buffer in the main memory, each chain being associated with a plurality of keys, and each translation record comprising:
      a key field comprising at least a portion of a key identifying a page in the main memory, and
      an associated address field having an address of the identified page;
   means for dereferencing, from the input key, a chain of translation records associated with the input key;
   means for searching through the dereferenced chain until a translation record key matches the input key;
   means for retrieving, upon finding a match, an address from the address field of the translation record having the matching key, and indicating the translation record as most recently used; and
   means for creating a least recently used (LRU) chain of translation records, ordered by most recent use, the chain providing an indication of most recently used and least recently used translation records.

75. The system of claim 74, further comprising:
   means for invoking, if no match is found, a page manager to establish an address corresponding to the input key,
   means for saving the address in an address field of at least recently used translation record, and for indicating the translation record as most recently used, and
   means for placing the translation record into the chain associated with the input key.

76. The system of claim 74 wherein the means for dereferences a chain comprises:
   means for applying a hashing function to the input key to obtain an index value referencing the dereferenced chain.

77. The system of claim 74 wherein each chain comprises a doubly-linked list.

78. The system of claim 74, wherein each translation record additionally has a version field, the system further comprising:
   means for saving, upon saving the address in the address field of a translation record, a version identifier in the version field of the translation record;
   means for incrementing the version identifier each time a different virtual page is associated with the address is changed;
   means for comparing, upon an input key match, the version identifier of the corresponding translation record with a last retrieved version identifier for the same input key; and
   means for retrieving the data from the page associated with the address only if the version identifies match.

79. The system of claim 74 wherein the input key comprises a context and a page number.

80. The system of claim 79 wherein the context comprises a database number and a page space number.

81. The system of claim 74, further comprising:
   means for associating each thread in a multithreaded system with its own translation buffer.

82. A system for translating, in a multi-threaded, software paging system, an input key to a corresponding memory address, comprising:
   means for allocating a plurality of translation lookaside buffers in the main memory, each translation lookaside buffer being associated with a thread of execution; and means for implementing translation lookaside buffer operation with software, such that, within a thread of execution, upon presentation of an input key to the associated translation lookaside buffer, the corresponding memory address is returned, and if the corresponding address was not found in the buffer, it is determined by a paging manager and stored in the associated buffer;

means for updating a version identifier each time a different virtual page is associated with a memory page associated with the version identifier, wherein each entry in each translation lookaside buffer comprises a version field indicative of the version of the memory page when last accessed by the associated thread;

means for comparing the version identifier associated with the retrieved memory address with a last retrieved version identifier for the input key; and means for retrieving the data from the page associated with the address only if the version identifiers match.

83. The system of claim 82 wherein the input key is a page descriptor comprising a context identifier and a page identifier.

* * * * *

UNITED STATES PATENT AND TRADEMARK OFFICE
CERTIFICATE OF CORRECTION

PATENT NO.   : 6,480,950 B1 Page 1 of 1
DATED        : November 12, 2002
INVENTOR(S)  : Igor Lyubashevskiy, Albert Hopeman and James E. Carey It is certified that error appears in the above-identified patent and that said Letters Patent is hereby corrected as shown below:

Column 12,
Line 1, delete "dereference" and insert -- dereferencer --.

Column 16,
Line 26, delete "field" after "associated";
Line 67, delete "received" and insert -- retrieved --.

Column 18,
Line 22, delete "," and insert -- ; --.

Column 19,
Line 6, insert -- entry -- after "translation";
Line 21, delete "address" and insert -- addressed --.

Column 20,
Line 27, delete "at" and insert -- a --;
Line 54, delete "identifies" and insert -- identifiers --;
Line 66, delete "the" before "main".

Signed and Sealed this

Fifteenth Day of April, 2003

JAMES E. ROGAN
*Director of the United States Patent and Trademark Office*